United States Patent
Ishida

(10) Patent No.: US 9,624,370 B2
(45) Date of Patent: Apr. 18, 2017

(54) STABLIZED POLYCARBONATE BLEND WITH POST CONSUMER RECYCLED PLASTICS

(71) Applicant: SABIC Global Technologies B.V., Bergen op Zoom (NL)

(72) Inventor: Hiromi Ishida, Tochigi-ken (JP)

(73) Assignee: SABIC Global Technologies B.V., Bergen op Zoom (NL)

(*) Notice: Subject to any disclaimer, the term of this patent is extended or adjusted under 35 U.S.C. 154(b) by 210 days.

(21) Appl. No.: 14/204,066

(22) Filed: Mar. 11, 2014

(65) Prior Publication Data
US 2014/0275382 A1     Sep. 18, 2014

Related U.S. Application Data

(60) Provisional application No. 61/788,372, filed on Mar. 15, 2013.

(51) Int. Cl.
  *C08L 69/00* (2006.01)
  *C08L 83/06* (2006.01)
  *C08L 55/02* (2006.01)

(52) U.S. Cl.
  CPC .............. *C08L 69/00* (2013.01); *C08L 83/06* (2013.01); *C08L 2207/20* (2013.01)

(58) Field of Classification Search
  CPC .......... C08L 69/00; C08L 83/06; C08L 55/02
  USPC ........ 524/284, 320, 502, 508, 506, 417, 414
  See application file for complete search history.

(56) References Cited

U.S. PATENT DOCUMENTS

| | | | |
|---|---|---|---|
| 4,746,701 A | 5/1988 | Kress et al. | |
| 5,420,181 A * | 5/1995 | Eichenauer | C08K 5/0008 524/100 |
| 5,441,997 A * | 8/1995 | Walsh | C08L 67/02 524/147 |
| 7,232,865 B2 * | 6/2007 | DeRudder | C08G 64/186 525/446 |
| 7,786,246 B2 | 8/2010 | Jansen et al. | |
| 7,884,140 B2 * | 2/2011 | Riise | B03C 7/00 521/40 |
| 8,017,697 B2 | 9/2011 | Carillo et al. | |

FOREIGN PATENT DOCUMENTS

| | | |
|---|---|---|
| EP | 0576948 A2 | 1/1994 |
| EP | 0576950 A2 | 1/1994 |

* cited by examiner

Primary Examiner — Bijan Ahvazi
Assistant Examiner — Ronald Grinsted
(74) Attorney, Agent, or Firm — Baker & Hostetler LLP

(57) ABSTRACT

In various aspects, the invention relates to blended thermoplastic polymer compositions (e.g., polycarbonate or polycarbonate-polysiloxane copolymer compositions) comprising recycled acrylonitrile-butadiene-styrene (ABS) polymer or recycled polystyrene polymer which contain at least one impurity and an acid melt flow stabilizer. The presence of the acid melt flow stabilizer improves the thermal stability of the polymer blend. In various further aspects, blended compositions further comprise a flame retardant. This abstract is intended as a scanning tool for purposes of searching in the particular art and is not intended to be limiting of the present invention.

16 Claims, 7 Drawing Sheets

# STABLIZED POLYCARBONATE BLEND WITH POST CONSUMER RECYCLED PLASTICS

CROSS REFERENCE TO RELATED PATENT APPLICATION

This application claims priority to U.S. Patent Application No. 61/788,372 filed Mar. 15, 2013, which is hereby incorporated herein by reference in its entirety.

BACKGROUND OF THE INVENTION

Various thermoplastic polymer compositions which include acrylonitrile-butadiene-styrene polymers and/or polystyrene polymers are used in a wide variety of applications. Accordingly, recycling of acrylonitrile-butadiene-styrene polymers and/or polystyrene polymers is desirable for sustainable use of these highly degradation resistant materials without detrimental environmental impact. A significant problem with reusing post-consumer recycled acrylonitrile-butadiene-styrene polymers and/or polystyrene polymers is that thermoplastic polymer blends which include polycarbonates or polycarbonate derivatives suffer from substantial reduction in melt stability during melt processing such as extrusion and molding.

Accordingly, it would be beneficial to provide thermoplastic polymer blends compositions, which include polycarbonates or polycarbonate derivatives and further comprise post-consumer recycled plastics of improved melt stability.

SUMMARY OF THE INVENTION

The present invention satisfies these and other needs by providing thermoplastic polymer blend compositions which include polycarbonates or polycarbonate derivatives and further comprise post-consumer recycled plastics with increased melt stability.

In one aspect, a thermoplastic polymer blend composition is provided. The compositions comprises from about 1 to less than about 99 parts by weight of a polycarbonate polymer component; from about 1 to less than about 50 parts by weight of at least one recycled polymer comprising a recycled acrylonitrile-butadiene-styrene (ABS) polymer, a recycled polystyrene (PS) polymer, or a combination thereof, wherein the recycled polymer comprises at least one impurity not present in an identical virgin polymer; and an acid melt flow stabilizer and where the thermoplastic polymer blend composition exhibits a melt flow rate measured at 260° C./2.16 kgf measured accordingly to ASTM D1238 that is lower than that of an identical reference polymer blend composition in the absence of the acid melt flow stabilizer.

In another aspect, a thermoplastic polymer blend composition is provided which comprises from about 1 to less than about 99 parts by weight of a polycarbonate polymer component; from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity selected from iron, aluminum, copper, magnesium, calcium, and polyurethane particle in an amount of at least about 10 ppm; an acid melt flow stabilizer.

In still further aspect, a thermoplastic polymer blend composition is provided which comprises a polycarbonate polymer component, at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and an acid melt flow stabilizer; wherein the acid melt flow stabilizer does not comprise a carboxylic acid; wherein the thermoplastic polymer blend composition exhibits a melt flow rate measured at 260° C./2.16 kgf that is lower than that of an identical reference polymer blend composition in the absence of the acid melt flow stabilizer.

In still another aspect, a method of forming a thermoplastic polymer blend composition is provided. The method comprises combining from about 1 to less than about 99 parts by weight of a polycarbonate polymer component; from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and an acid melt flow stabilizer, to form the thermoplastic polymer blend composition; wherein the formed thermoplastic polymer blend composition exhibits a melt flow rate measured at 260° C./2.16 kgf measured accordingly to ASTM D1238 that is lower than that of an identical reference polymer blend composition in the absence of the acid melt flow stabilizer.

In still another aspect, a method of forming a thermoplastic polymer blend composition is provided which comprises combining a polycarbonate polymer component; at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and an acid melt flow stabilizer, where the acid melt flow stabilizer does not comprise a carboxylic acid, to form the thermoplastic polymer blend composition; and where the formed thermoplastic polymer blend composition exhibits a melt flow rate measured at 260° C./2.16 kgf that is lower than that of an identical reference polymer blend composition in the absence of the acid melt flow stabilizer.

In still another aspect, a method of forming a thermoplastic polymer blend composition is provided which comprises combining from about 1 to less than about 99 parts by weight of a polycarbonate polymer; from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity selected from iron, aluminum, copper, magnesium, calcium and polyurethane particles in an amount of at least about 10 ppm; and an acid melt flow stabilizer to form the thermoplastic polymer blend composition.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
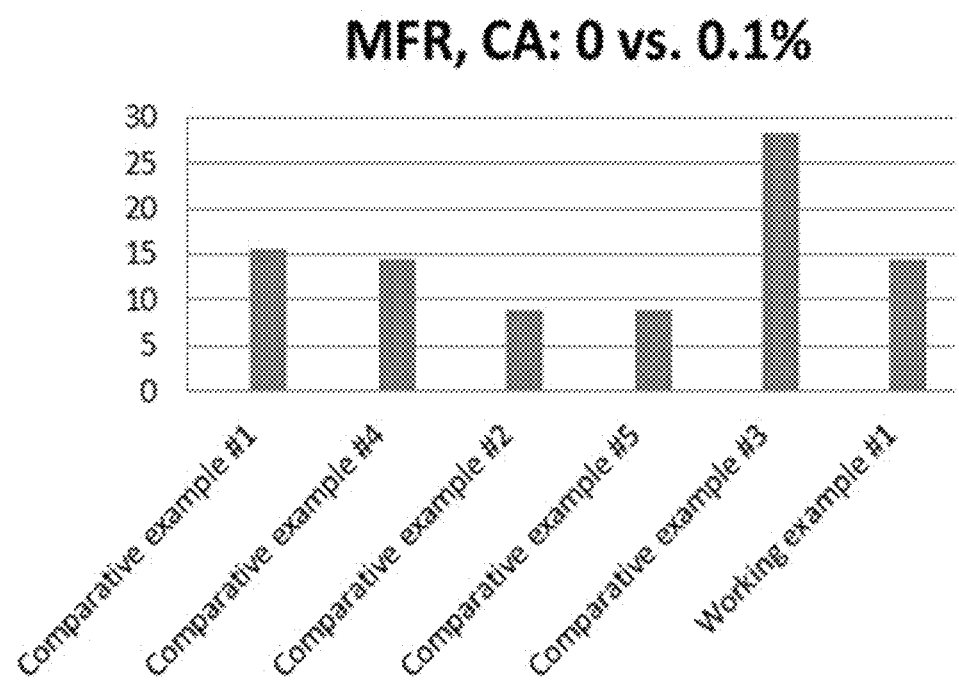
FIG. 1 is a schematic representation of the effect of citric acid addition as an acid melt flow stabilizer additive, on melt flow rate (MFR) of the thermoplastic polymer blend composition as compared to the comparator examples Comparative Examples 1-5.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

DEFINITIONS

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate polymer" includes mixtures of two or more polycarbonate polymers.

As used herein, the term "combination" is inclusive of lends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of an acid melt flow stabilizer refers to an amount that is sufficient to achieve the desired improvement in the property modulated by the formulation component, e.g., improved melt stability, under applicable test conditions and without adversely affecting other specified properties. The specific level in terms of wt. % or parts by weight in a composition required as an effective amount will depend upon a variety of factors including the amount and type of polycarbonate, amount and type of plastics, amount and type of optional additives, and end use of the article made using the composition.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %" of a component, which can be used interchangeably, unless specifically stated to the contrary, are based on the total weight of the formulation or composition in which the component is included. For example if a particular element or component in a composition or article is said to have 8% by weight, it is understood that this percentage is relative to a total compositional percentage of 100% by weight.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

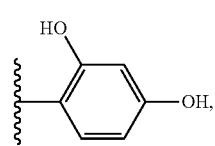 [SMILES: *c1ccc(O)cc1O]

regardless of whether 2,4-dihydroxyphenyl is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5, 6, 7, 8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

$$M_n = \frac{\sum N_i M_i}{\sum N_i},$$

where $M_i$ is the molecular weight of a chain and $N_i$ is the number of chains of that molecular weight. $M_n$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

$$M_n = \frac{\sum N_i M_i}{\sum N_i},$$

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA" or "bisphenol A," which can be used interchangeably, as used herein refers to a compound having a structure represented by the formula:

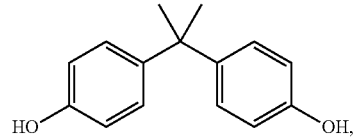

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g. dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein, the term "ABS" or "acrylonitrile-butadiene-styrene copolymer" refers to an acrylonitrile-butadiene-styrene polymer which can be an acrylonitrile-butadiene-styrene terpolymer or a blend of styrene-butadiene rubber and styrene-acrylonitrile copolymer.

As used herein, the term "identical reference polymer blend composition" refers to a composition that is identical to the inventive composition by comprising essentially the same proportions and components as the inventive composition but in the absence of a stated component.

As used herein, the term "identical virgin polymer" refers to the identical polymer that has not been recycled. As an example and without limitations, an identical virgin polymer may be free of one or more impurities that are comprised in a recycled polymer As used herein, the term "recycled acrylonitrile-butadiene-styrene polymer," or "recycled ABS," or "recycled polystyrene," or "recycled PS" refers to a recycled acrylonitrile-butadiene-styrene or recycled polystyrene that comprises at least one impurity not present in a corresponding, substantially similar or identical virgin acrylonitrile-butadiene-styrene or polystyrene polymer.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Polycarbonate Compositions

As briefly described above, the present disclosure generally relates to a blended polycarbonate composition comprising a polycarbonate component and at least one recycled plastic component. Conventionally, incorporation of recycled plastic materials, such as a recycled acrylonitrile-butadiene-styrene (ABS) polymer or recycled polystyrene polymer results in deterioration of melt flow stability as evidenced by undesirable increase in melt flow rate for the blend composition when compared to a similar composition comprising a virgin plastic component. This is due, at least in part, to the presence of one or more impurities in the recycled plastic component that are not present in corresponding virgin material.

As described more fully below, the incorporation of an acid melt flow stabilizer in a polycarbonate blend comprising recycled plastic components has been found to reduce or even prevent the deterioration of the melt stability of such blended thermoplastic compositions comprising recycled plastic components. Accordingly, aspects of the present invention generally provide a thermoplastic polymer blend composition comprising a polycarbonate component; at least one recycled polymer component comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer, and an acid melt flow stabilizer wherein the thermoplastic polymer blend composition exhibits a melt flow rate measured at 260° C./2.16 kgf according to ASTM D1238 testing standard that is lower than that of an identical reference polymer blend composition in the absence of the acid melt flow stabilizer.

In one aspect disclosed herein a thermoplastic polymer blend composition, comprising: a) from about 1 to less than about 99 parts by weight of a polycarbonate polymer component; b) from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and c) an acid melt flow stabilizer; wherein the thermoplastic polymer blend composition exhibits a melt flow rate measured at 260° C./2.16 kgf measured accordingly to ASTM D1238 that is lower than that of an identical reference polymer blend composition in the absence of the acid melt flow stabilizer.

In another aspect, the disclosed the thermoplastic polymer blend composition can further comprise from greater than 0 to about 30 parts by weight of a flame retardant.

In yet another aspect, the thermoplastic polymer blend composition can comprise the acid melt flow stabilizer that is present in an amount from greater than 0 to about 2.0 parts by weight per 100 parts by weight of the thermoplastic polymer blend composition.

In a further aspect, the thermoplastic polymer blend composition can comprise: a) from about 65 to less than about 75 parts by weight of at least one bisphenol A polycarbonate polymer; b) from about 25 to less than about 35 parts by weight of the at least one recycled polymer; and c) from greater than 0 to about 0.1 parts by weight of the acid melt flow stabilizer per 100 parts by weight of the thermoplastic blend composition.

In a yet further aspect, the thermoplastic polymer blend composition can comprise: a) from about 60 to about 80 parts by weight of at least one bisphenol A polycarbonate polymer; b) from about 10 to less than about 30 parts by weight of the at least one recycled polymer; c) from greater than 0 to about 0.1 parts by weight of the acid melt flow stabilizer, and d) from about 5 to about 20 parts by weight of a flame retardant, and wherein total amounts of (a) through (d) are 100 parts by weight.

In one aspect, the thermoplastic polymer blend composition can comprise: a) from about 1 to less than about 99 parts by weight of a polycarbonate polymer component; b) from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity selected from iron, aluminum, copper, magnesium, calcium and polyurethane particle in an amount in the range from at least about 10 ppm to about 10000 ppm; and c) an acid melt flow stabilizer.

In yet another aspect, the thermoplastic polymer blend composition can comprise: a) a polycarbonate polymer component; b) at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and c) an acid melt flow stabilizer, wherein the acid melt flow stabilizer does not comprise a carboxylic acid; and wherein the thermoplastic polymer blend composition exhibits a melt flow rate measured at 260° C./2.16 kgf that is lower than that of an identical reference polymer blend composition in the absence of the acid melt flow stabilizer.

In one aspect, the disclosed thermoplastic polymer blend composition exhibits a melt flow rate that is at least 2% lower than that of an identical reference polymer blend composition in the absence of the acid melt flow stabilizer. In another aspect, the melt flow rate is at least 5%, 10%, 15%, 20%, 25%, 30%, 35%, 40%, 45%, or 50% lower than that of an identical reference polymer blend composition in the absence of the acid melt flow stabilizer.

In various aspects, the invention relates to blended thermoplastic polymer compositions (e.g., polycarbonate or polycarbonate-polysiloxane copolymer compositions) comprising at least one recycled polymer comprising a recycled acrylonitrile-butadiene-styrene (ABS) polymer, a recycled polystyrene polymer, or a combination thereof, which contain at least one impurity and an acid melt flow stabilizer. The presence of the acid melt flow stabilizer improves the thermal stability of the polymer blend. In various further aspects, blended compositions further comprise a flame retardant. In a further aspect, the resulting compositions are capable of being used in the production of molded articles. In still a further aspect, the molded articles exhibits a notched Izod impact that is greater than that of an identical reference polymer blend composition formed in the absence of the acid melt flow stabilizer.

In one aspect, the at least one impurity can comprise one or more of iron, aluminum, copper, magnesium, calcium, and polyurethane particle in an amount of at least about 10 ppm. In another aspect, the at least one impurity can be selected from a group consisting of iron, aluminum, copper, magnesium, calcium, and polyurethane particle in an amount of at least about 10 ppm. In one aspect, the at least one impurity can comprise one or more of iron, aluminum, copper, magnesium, calcium, and polyurethane particle in an amount in the range from at least about 10 ppm to about 10000 ppm, including exemplary values of 20 ppm, 50 ppm, 80 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 2000 ppm, 3000 ppm, 4000 ppm, 5000 ppm, 6000 ppm, 7000 ppm, 8000 ppm, and 9000 ppm. In yet another aspect, the at least one impurity can be selected from a group consisting of iron, aluminum, copper, magnesium, calcium, and polyurethane particle in an amount in the range from at least about 10 ppm to about 10000 ppm, including exemplary values of 20 ppm, 50 ppm, 80 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 2000 ppm, 3000 ppm, 4000 ppm, 5000 ppm, 6000 ppm, 7000 ppm, 8000 ppm, and 9000 ppm.

In one aspect, the molded article exhibits a notched Izod impact that is greater than at least 5% that of an identical reference polymer blend composition formed in the absence of the acid melt flow stabilizer. In another aspect a notched Izod impact of the molded article from the disclosed composition is greater than at least 10%, including exemplarily values that are greater than at least 20%, 30%, 40%, 50%, 60%, 70%, 80%, 90%, 100%, 110%, 120%, 130%, 140%, 150%, 160%, 170%, 180%, 190%, 200%, 210%, 220%, 230%, 240%, 250%, 260%, 270%, 280%, 290%, 300%, 310%, 320%, 330%, 340%, 350%, 360%, 370%, 380%, 390%, 400%, 410%, 420%, 430%, 440%, 450%, 460%, 470%, 480%, 490%, or at least 500% that of an identical reference polymer blend composition formed in the absence of the acid melt flow stabilizer.

Polycarbonate Polymer Component

The term polycarbonate as used herein is not intended to refer to only a specific polycarbonate or group of polycarbonates, but rather refers to the any one of the class of compounds containing a repeating chain of carbonate groups. In one aspect, a polycarbonate material can include any one or more of those polycarbonate materials disclosed and described in U.S. Pat. No. 7,786,246, which is hereby incorporated by reference in its entirety for the specific purpose of disclosing various polycarbonate compositions and methods for manufacture of same.

In one aspect, a polycarbonate polymer component as disclosed herein can be an aliphatic-diol based polycarbonate. In another aspect, the polycarbonate polymer component can comprise a carbonate unit derived from a dihydroxy compound, such as, for example, a bisphenol that differs from the aliphatic diol. In still further aspects, an exemplary polycarbonate polymer component includes aromatic polycarbonates conventionally manufactured through a transesterification reaction of one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl) sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine ("PPPBP"), and 9,9-bis(4-hydroxyphenyl) fluorene. Combinations comprising at least one dihydroxy aromatic compound can also be used. In another aspect, other types of diols can be present in the polycarbonate.

In a yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In a still another aspect, mixtures comprising linear polycarbonates and branched polycarbonates can be used.

The polycarbonate polymer component can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). In another aspect, the first polycarbonate component does not comprise a separate polymer such as a polyester. In one aspect, an aliphatic-based polycarbonate comprises aliphatic units that are either aliphatic carbonate units derived from aliphatic diols, or a combination of aliphatic ester units derived from aliphatic diacids having greater than 13 carbons.

In one aspect, the molecular weight of any particular polycarbonate can be determined by, for example, gel permeation chromatography using universal calibration methods based on polystyrene (PS) standards. Generally polycarbonates can have a weight average molecular weight (Mw), of greater than about 5,000 g/mol based on PS standards. In one aspect, the polycarbonates can have an Mw of greater than or equal to about 20,000 g/mol, based on PS standards. In another aspect, the polycarbonates have an Mw based on PS standards of about 20,000 to 100,000 g/mol, including for example 30,000 g/mol, 40,000 g/mol, 50,000 g/mol, 60,000 g/mol, 70,000 g/mol, 80,000 g/mol, or 90,000 g/mol. In still further aspects, the polycarbonates have an Mw based on PS standards of about 22,000 to about 50,000 g/mol. In still further aspects, the polycarbonates have an Mw based on PS standards of about 25,000 to 40,000 g/mol.

Molecular weight (Mw and Mn) as described herein, and polydispersity as calculated therefrom, can be determined using gel permeation chromatography (GPC), using a cross-linked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 ml/min. In one aspect, the glass transition temperature (Tg) of a polycarbonate can be less than or equal to about 160° C., less than or equal to about 150° C., less than or equal to about 145° C., less than or equal to about 140° C., or less than or equal to about 135° C. In a further aspect, the glass transition temperature of a polycarbonate can be from about 85° C. to about 160° C., from about 90° C. to about 160° C., from about 90° C. to about 150° C., or from about 90° C. to about 145° C. In a still further aspect, the glass transition temperature of a polycarbonate can be from about 85° C. to about 130° C., from about 90° C. to about 130° C., from about 90° C. to about 125° C., or from about 90° C. to about 120° C.

In one aspect, disclosed polycarbonate polymer components can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, about 8 to about 10.

The polycarbonate can, in various aspects, be prepared by a melt polymerization process. Generally, in the melt polymerization process, polycarbonates are prepared by co-reacting, in a molten state, the dihydroxy reactant(s) and a diaryl carbonate ester, such as diphenyl carbonate, or more specifically in an aspect, an activated carbonate such as bis (methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O_2^-$), thiolate ($HS^-$), sulfide ($S_2^-$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization. In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R_3)_4QX$, wherein each $R_3$ is the same or different, and is a C1-10 alkyl group; Q is a nitrogen or phosphorus atom; and X is a halogen atom or a C1-8 alkoxy group or C6-18 aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl—, Br—, a C1-8 alkoxy group or a C6-18 aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl) carbonate and the like. In one aspect, bis(methylsalicyl) carbonate is used as the activated carbonate in melt polycarbonate synthesis due to its lower molecular weight and higher vapor pressure. Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and C1-C22 alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In another aspect, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In one aspect, where a combination of alpha and beta catalysts are used in the melt polymerization, a polycarbonate polymer prepared from an activated carbonate can comprise endgroups in an amount of less than 2,000 ppm, less than 1,500 ppm, or less than 1,000 ppm, based on the weight of the polycarbonate. In another aspect, where only an alpha catalyst is used in the melt polymerization, a polycarbonate polymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

In an exemplary aspect, the polycarbonate polymer component comprises a bisphenol A polycarbonate polymer. In another exemplary aspect, the polycarbonate component comprises a blend of at least two different grade bisphenol A polycarbonates. To that end, a polycarbonate grade can, for example, be characterized by the melt volume rate (MVR) of the polycarbonate. For example, a disclosed polycarbonate, such as a bisphenol A polycarbonate, can be characterized by exhibiting a melt Volume Rate (MVR) in the range of from 4 g/10 min to 30 g/10 min at 300° C./1.2 kg. For example, the MVR can range from 10 g/10 min to 25 g/10 min, including for example a MVR in the range of from 15 g/10 min to 20 g/10 min. Further, for example, the MVR can be in the range of from 4 g/10 min or 30 g/10 min.

In a further aspect, the polycarbonate component of the thermoplastic polymer blend composition comprises Bisphenol A residues. In a still further aspect, the polycarbonate component of the blended polycarbonate composition has a weight average molecular weight of from about 15,000 g/mol to about 100,000 g/mol on an absolute polycarbonate molecular weight scale. In a still further aspect, the polycarbonate component of the blended polycarbonate composition has a weight average molecular weight of from about 20,000 g/mol to about 50,000 g/mol on an absolute polycarbonate molecular weight scale. In reference to the weight average molecular weight ($M_W$) of the polycarbonate component, it is understood that the $M_w$ is the absolute $M_w$ determined by gel permeation chromatography relative to traceable polycarbonate standards.

The polycarbonate component can be present in the thermoplastic polymer blend composition in any desired amount. For example, according to aspects of the disclosure, the polycarbonate polymer component can be present in an amount in the range from about 1 to less than about 99 parts by weight, including further exemplary amounts of about 5 parts by weight, 10 parts by eight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight and 95 parts by weight. In still further aspects, the polycarbonate component can be present within any range of amount derived from any two of the above states values. For examples, the polycarbonate polymer component can be present in an amount in the range of from about 1 part by weight to 90 parts by weight, or in an amount from 10 parts by weight to about 80 parts by weight, or in amount in the range from about 65 parts by weight to about 75 parts by weight.

In aspects where the polycarbonate component comprises a blend of two or more polycarbonate polymers, it should be understood that each respect polycarbonate polymer present within the polycarbonate component can be present in any desired amount relative to the total amount of the polycarbonate polymer component. For example, in an aspect wherein the polycarbonate polymer component comprises at least a first and a second polycarbonate polymer, the first polycarbonate polymer can be present in an amount in the range of from greater than 0 weight % to less than 100 weight % relative to the total weight of the polycarbonate polymer component. Similarly, the second polycarbonate polymer can also be present in an amount in the range of from greater than 0 weight % to less than 100 weight % relative to the total weight of the polycarbonate polymer component.

For example, in an exemplary aspect, a polycarbonate polymer component comprising two different grade bisphenol A polycarbonates can be present in the thermoplastic composition in an amount in the range of from about 14 to 16 weight percent. According to this aspect, a first bisphenol A polycarbonate can be present in an amount in the range of from about 5 to about 6 weight percent relative to the total weight of thermoplastic composition or, expressed in an alternative manner, in an amount in the range of from 35 weight percent to about 45 weight percent relative to the total weight percent of the polycarbonate component. Likewise, the second bisphenol A polycarbonate can be present in an amount in the range of from about 9 to about 10 weight percent relative to the total weight of thermoplastic composition or, expressed in an alternative manner, in an amount in the range of from 55 weight percent to about 65 weight percent relative to the total weight percent of the polycarbonate component. In at least one aspect, the at least one polycarbonate comprises at least 5 weight percentage relative to the thermoplastic composition's total weight percentage. For example, the total polycarbonate amount ranges from 5 wt % to 14 wt %, relative to the thermoplastic composition's total weight percentage.

In another exemplary aspect, a polycarbonate polymer component comprising two different grade bisphenol A polycarbonates can be present in the thermoplastic composition in an amount in the range of from about 70 to 72 weight percent. According to this aspect, a first bisphenol A polycarbonate can be present in an amount in the range of from about 53 to about 54 weight percent relative to the total weight of thermoplastic composition or, expressed in an alternative manner, in an amount in the range of from 73 weight percent to about 78 weight percent relative to the total weight percent of the polycarbonate component. Likewise, the second bisphenol A polycarbonate can be present in an amount in the range of from about 17 to about 18 weight percent relative to the total weight of thermoplastic composition or, expressed in an alternative manner, in an amount in the range of from 22 weight percent to about 27 weight percent relative to the total weight percent of the polycarbonate component.

In still further aspects, the polycarbonate component of the disclosed thermoplastic polymer blend compositions can comprise a polycarbonate-polysiloxane block copolymer component. As used herein, the term polycarbonate-polysiloxane copolymer is equivalent to polysiloxane-polycarbonate copolymer, polycarbonate-polysiloxane polymer, or polysiloxane-polycarbonate polymer. The polysiloxane-polycarbonate copolymer comprises polydiorganosiloxane blocks comprising structural units of the general formula (I) below:

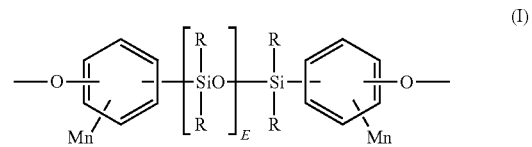

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (II) below:

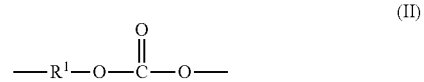

wherein at least 60 percent of the total number of $R^1$ groups comprise aromatic moieties and the balance thereof comprise aliphatic, alicyclic, or aromatic moieties.

According to exemplary non-limiting aspects of the disclosure, the polycarbonate-polysiloxane block copolymer comprises diorganopolysiloxane blocks of the general formula (III) below:

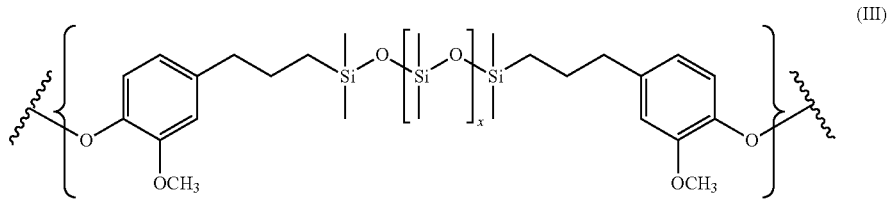

(III)

wherein x represents an integer from about 20 to about 60. The polycarbonate blocks according to these aspects can be derived from bisphenol-A monomers.

Diorganopolysiloxane blocks of formula (III) above can be derived from the corresponding dihydroxy compound of formula (IV):

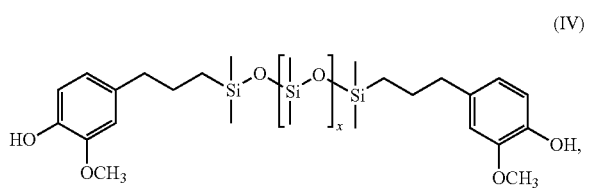

(IV)

wherein x is as described above. Compounds of this type and others are further described in U.S. Pat. No. 4,746,701 to Kress, et al and U.S. Pat. No. 8,017,0697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (V):

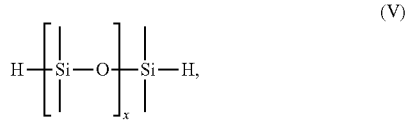

(V)

wherein x is a previously defined, and an aliphatically unsaturated monohydric phenol such as eugenol to yield a compound of formula (IV).

The polycarbonate-polysiloxane copolymer may be manufactured by reaction of a diphenolic polysiloxane, such as that depicted by formula (IV), with a carbonate source and a dihydroxy aromatic compound such as bisphenol-A, optionally in the presence of a phase transfer catalyst as described above. Suitable conditions are similar to those useful in forming polycarbonates. For example, the copolymers can be prepared by phosgenation at temperatures from below 0° C. to about 100° C., including for example, at temperatures from about 25° C. to about 50° C. Since the reaction is exothermic, the rate of phosgene addition can be used to control the reaction temperature. The amount of phosgene required will generally depend upon the amount of the dihydric reactants. Alternatively, the polycarbonate-polysiloxane copolymers can be prepared by co-reacting, in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane can be selected so as to provide the desired amount of diorganopolysiloxane units in the copolymer. The particular amounts used will therefore be determined depending on desired physical properties of the composition, the value of x (for example, within the range of about 20 to about 60), and the type and relative amount of each component in the composition, including the type and amount of polycarbonate, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein.

For example, according to aspects of the disclosure, the polysiloxane-polycarbonate block copolymer can be provided having any desired level of siloxane content. For example, the siloxane content can be in the range of from 4 mole % to 20 mole %. In additional aspects, the siloxane content of the polysiloxane-polycarbonate block copolymer can be in the range of from 4 mole % to 10 mole %. In still further aspects, the siloxane content of the polysiloxane-polycarbonate block copolymer can be in the range of from 4 mole % to 8 mole %. In a further aspect, the polysiloxane-polycarbonate copolymer comprises a diorganosiloxane content in the range of from 5 to 7 mole wt. %. In still other aspects, the siloxane content of the polysiloxane-polycarbonate block copolymer can be about 6 mole %. Still further, the diorganopolysiloxane blocks can be randomly distributed in the polysiloxane-polycarbonate block copolymer.

The disclosed polysiloxane-polycarbonate block copolymers can also be end-capped as similarly described in connection with the manufacture of polycarbonates set forth herein. For example, according to aspects of the disclosure, a polysiloxane-polycarbonate block copolymer can be end capped with p-cumyl-phenol.

A non-limiting example of a polycarbonate-siloxane copolymer includes transparent EXL, available from SABIC Innovative Plastics. The transparent EXL from SABIC is a polycarbonate-polysiloxane (9030T) copolymer, having been tested commercially and found to have about 6 mole % siloxane, a Mw of about 44,600, and a Mn of about 17,800 in a polystyrene standard using chloroform solvent.

Useful polycarbonate-polysiloxane copolymers are commercially available and include, but are not limited to, those marketed under the trade name LEXAN™ EXL polymers, and are available from SABIC Innovative Plastics (formerly GE Plastics), including blends of LEXAN™ EXL polymers with different properties.

The polysiloxane polycarbonate copolymer component can be present in the thermoplastic composition in any desired amount. In one aspect, the polycarbonate-polysiloxane copolymer component is a polycarbonate-polydimethylsiloxane copolymer. In another aspect, the polycarbonate portion of the polycarbonate-polysiloxane copolymer comprises residues derived from BPA. In still another aspect, the polycarbonate portion of the polycarbonate-polysiloxane copolymer comprising residues derived from BPA is a homopolymer. In still another aspect, the polycarbonate-polysiloxane copolymer component comprises a polycarbonate-polysiloxane block copolymer.

In one aspect, the polycarbonate-polysiloxane block copolymer comprises a polycarbonate-polydimethylsiloxane block copolymer. In another aspect, the polycarbonate block comprises residues derived from BPA. In still other aspect, the polycarbonate block comprising residues derived from BPA is a homopolymer.

In one aspect, the polysiloxane block has a weight average molecular weight from about 20,000 to about 26,000 Daltons. In another aspect, the polysiloxane block has a weight average molecular weight from about 21,000 to about 25,000 Daltons. In still another aspect, the polysiloxane block has a weight average molecular weight from about 22,000 to about 24,000 Daltons. In still another aspect, the polysiloxane block has a weight average molecular weight of about 22,000 Daltons. In still another aspect, the polysiloxane block has a weight average molecular weight of about 23,000 Daltons. In still another aspect, the polysiloxane block has a weight average molecular weight of about 24,000 Daltons. In still another aspect, the polysiloxane block has a weight average molecular weight of about 25,000 Daltons.

In one aspect, the polycarbonate-polysiloxane block copolymer comprises from about 15 wt % to about 25 wt % siloxane. In another aspect, the polycarbonate-polysiloxane block copolymer comprises from about 17 wt % to about 23 wt % siloxane. In still another aspect, the polycarbonate-polysiloxane block copolymer comprises from about 18 wt % to about 22 wt % siloxane. In still another aspect, the polycarbonate-polysiloxane block copolymer comprises from about 19 wt % to about 21 wt % siloxane. In still another aspect, the polycarbonate-polysiloxane block copolymer comprises about 18 wt % siloxane. In still another aspect, the polycarbonate-polysiloxane block copolymer comprises about 19 wt % siloxane. In still another aspect, the polycarbonate-polysiloxane block copolymer comprises about 20 wt % siloxane. In still another aspect, the polycarbonate-polysiloxane block copolymer comprises about 21 wt % siloxane. In still another aspect, the polycarbonate-polysiloxane block copolymer comprises about 22 wt % siloxane.

In one aspect, the polysiloxane block has a weight average molecular weight from about 25,000 to about 32,000 Daltons. In another aspect, the polysiloxane block has a weight average molecular weight from about 26,000 to about 31,000 Daltons. In still another aspect, the polysiloxane block has a weight average molecular weight from about 27,000 to about 30,000 Daltons. In still another aspect, the polysiloxane block has a weight average molecular weight from about 28,000 to about 30,000 Daltons. In still another aspect, the polysiloxane block has a weight average molecular weight of about 27,000 Daltons. In still another aspect, the polysiloxane block has a weight average molecular weight of about 28,000 Daltons. In still another aspect, the polysiloxane block has a weight average molecular weight of about 29,000 Daltons. In still another aspect, the polysiloxane block has a weight average molecular weight of about 30,000 Daltons. In still another aspect, the polysiloxane block has a weight average molecular weight of about 31,000 Daltons.

Recycled Plastic Component

The disclosed thermoplastic polymer blend composition further comprises a recycled plastic component. The plastic component can be reclaimed from post-consumer sources. Yet further, the plastic component can be reclaimed from post-consumer sources, including but not limited to, home appliances waste e.g. TV, air-conditioners, washing machines, refrigerators, and like. Irrespective of the source, the recycled plastic component can be similar or even identical to those virgin plastic components. However, an important difference between the virgin plastic components and recycled plastics utilized in the present compositions, is the presence of at least one impurity that is not present in a virgin material. In one aspect and without limitations the impurities can include metals, for example, iron, aluminum, copper, magnesium, calcium and polyurethane particles that cannot be fully removed during the recycling process.

In one aspect, the at least one impurity can comprise one or more of iron, aluminum, copper, magnesium, calcium, and polyurethane particle in an amount of at least about 10 ppm. In another aspect, the at least one impurity can be selected from a group consisting of iron, aluminum, copper, magnesium, calcium, and polyurethane particle in an amount of at least about 10 ppm. In one aspect, the at least one impurity can comprise one or more of iron, aluminum, copper, magnesium, calcium, and polyurethane particle in an amount in the range from at least about 10 ppm to about 10000 ppm, including exemplary values of 20 ppm, 50 ppm, 80 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 2000 ppm, 3000 ppm, 4000 ppm, 5000 ppm, 6000 ppm, 7000 ppm, 8000 ppm, and 9000 ppm. In yet another aspect, the at least one impurity can be selected from a group consisting of iron, aluminum, copper, magnesium, calcium, and polyurethane particle in an amount in the range from at least about 10 ppm to about 10000 ppm, including exemplary values of 20 ppm, 50 ppm, 80 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 2000 ppm, 3000 ppm, 4000 ppm, 5000 ppm, 6000 ppm, 7000 ppm, 8000 ppm, and 9000 ppm.

Recycled plastic components suitable for use in the disclosed thermoplastic blend compositions include recycled acrylonitrile-butadiene-styrene polymer (ABS), a recycled acrylonitrile-styrene-butyl acrylate (ASA) polymer, a recycled methyl methacrylate-acrylonitrile-butadiene-styrene (MABS) polymer, a recycled methyl methacrylate-butadiene-styrene (MBS) polymer, and a recycled acrylonitrile-ethylene-propylene-diene-styrene (AES) polymer. In a still further aspect, the recycled plastic can be a recycled acrylonitrile-butadiene-styrene polymer ("ABS polymer"). In a still further aspect, a suitable plastic is a recycled bulk polymerized ABS polymer ("BABS polymer" or "Bulk ABS polymer"). In still a further aspect, the recycled plastic component can be recycled polystyrene (PS).

Acrylonitrile-butadiene-styrene ("ABS") graft copolymers contain two or more polymeric parts of different compositions, which are bonded chemically. The graft copolymer is specifically prepared by first polymerizing a conjugated diene, such as butadiene or another conjugated diene, with a monomer copolymerizable therewith, such as styrene, to provide a polymeric backbone. After formation of the polymeric backbone, at least one grafting monomer, and specifically two, are polymerized in the presence of the polymer backbone to obtain the graft copolymer. These resins are prepared by methods well known in the art.

For example, ABS can be made by one or more of emulsion or solution polymerization processes, bulk/mass, suspension and/or emulsion-suspension process routes. In addition, ABS materials can be produced by other process techniques such as batch, semi batch and continuous polymerization for reasons of either manufacturing economics or product performance or both. In order to reduce point defects or inclusions in the inner layer of the final multilayer article, the ABS is produced by bulk polymerized.

Emulsion polymerization of vinyl monomers gives rise to a family of addition polymers. In many instances the vinyl emulsion polymers are copolymers containing both rubbery and rigid polymer units. Mixtures of emulsion resins, especially mixtures of rubber and rigid vinyl emulsion derived polymers are useful in blends.

Such rubber modified thermoplastic resins made by an emulsion polymerization process can comprise a discontinuous rubber phase dispersed in a continuous rigid thermoplastic phase, wherein at least a portion of the rigid thermoplastic phase is chemically grafted to the rubber phase. Such a rubbery emulsion polymerized resin can be further blended with a vinyl polymer made by an emulsion or bulk polymerized process. However, at least a portion of the vinyl polymer, rubber or rigid thermoplastic phase, blended with polycarbonate, will be made by emulsion polymerization.

Suitable rubbers for use in making a vinyl emulsion polymer blend are rubbery polymers having a glass transition temperature (Tg) of less than or equal to 25° C., more preferably less than or equal to 0° C., and even more preferably less than or equal to −30° C. As referred to herein, the Tg of a polymer is the Tg value of polymer as measured by differential scanning calorimetry (heating rate 20° C./minute, with the Tg value being determined at the inflection point). In another embodiment, the rubber comprises a linear polymer having structural units derived from one or more conjugated diene monomers. Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene and dibromobutadiene as well as mixtures of conjugated diene monomers. In a preferred embodiment, the conjugated diene monomer is 1,3-butadiene.

The emulsion polymer may, optionally, include structural units derived from one or more copolymerizable monoethylenically unsaturated monomers selected from ($C_2$-$C_{12}$) olefin monomers, vinyl aromatic monomers and monoethylenically unsaturated nitrile monomers and ($C_2$-$C_{12}$) alkyl (meth)acrylate monomers. As used herein, the term "($C_2$-$C_{12}$) olefin monomers" means a compound having from 2 to 12 carbon atoms per molecule and having a single site of ethylenic unsaturation per molecule. Suitable ($C_2$-$C_{12}$) olefin monomers include, e.g., ethylene, propene, 1-butene, 1-pentene, heptene, 2-ethyl-hexylene, 2-ethyl-heptene, 1-octene, and 1-nonene. As used herein, the term "($C_1$-$C_{12}$) alkyl" means a straight or branched alkyl substituent group having from 1 to 12 carbon atoms per group and includes, e.g., methyl, ethyl, n-butyl, sec-butyl, t-butyl, n-propyl, isopropyl, pentyl, hexyl, heptyl, octyl, nonyl, decyl, undecyl and dodecyl, and the terminology "(meth)acrylate monomers" refers collectively to acrylate monomers and methacrylate monomers.

The rubber phase and the rigid thermoplastic phase of the emulsion modified vinyl polymer may, optionally, include structural units derived from one or more other copolymerizable monoethylenically unsaturated monomers such as, e.g., monoethylenically unsaturated carboxylic acids such as, e.g., acrylic acid, methacrylic acid, itaconic acid, hydroxy ($C_1$-$C_{12}$) alkyl (meth)acrylate monomers such as, e.g., hydroxyethyl methacrylate; ($C_5$-$C_{12}$) cycloalkyl (meth) acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_5$-$C_{12}$) cycloalkyl" means a cyclic alkyl substituent group having from 5 to 12 carbon atoms per group and the term "(meth)acrylamide" refers collectively to acrylamides and methacrylamides.

In some cases the rubber phase of the emulsion polymer is derived from polymerization of a butadiene, $C_4$-$C_{12}$ acrylates or combination thereof with a rigid phase derived from polymerization of styrene, $C_1$-$C_3$ acrylates, methacrylates, acrylonitrile or combinations thereof where at least a portion of the rigid phase is grafted to the rubber phase. In other instances more than half of the rigid phase will be grafted to the rubber phase.

Suitable vinyl aromatic monomers include, e.g., styrene and substituted styrenes having one or more alkyl, alkoxyl, hydroxyl or halo substituent group attached to the aromatic ring, including, e.g., -methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers. As used herein, the term "monoethylenically unsaturated nitrile monomer" means an acyclic compound that includes a single nitrile group and a single site of ethylenic unsaturation per molecule and includes, e.g., acrylonitrile, methacrylonitrile, a-chloro acrylonitrile.

In an alternative embodiment, the rubber is a copolymer, preferably a block copolymer, comprising structural units derived from one or more conjugated diene monomers and up to 90 percent by weight ("wt. %") structural units derived from one or more monomers selected from vinyl aromatic monomers and monoethylenically unsaturated nitrile monomers, such as, a styrene-butadiene copolymer, an acrylonitrile-butadiene copolymer or a styrene-butadiene-acrylonitrile copolymer. In another embodiment, the rubber is a styrene-butadiene block copolymer that contains from 50 to 95 wt. % structural units derived from butadiene and from 5 to 50 wt. % structural units derived from styrene.

The emulsion derived polymers can be further blended with non-emulsion polymerized vinyl polymers, such as those made with bulk or mass polymerization techniques. A process to prepare mixtures containing polycarbonate, an emulsion derived vinyl polymer, along with a bulk polymerized vinyl polymers, is also contemplated.

The rubber phase can be made by aqueous emulsion polymerization in the presence of a radical initiator, a surfactant and, optionally, a chain transfer agent and coagulated to form particles of rubber phase material. Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate. Suitable chain transfer agents include, for example, a ($C_9$-$C_{13}$) alkyl mercaptan compound such as nonyl mercaptan, t-dodecyl mercaptan. Suitable emulsion aids include, linear or branched carboxylic acid salts, with about 10 to 30 carbon atoms. Suitable salts include ammonium carboxylates and alkaline carboxylates; such as ammonium stearate, methyl ammonium behenate, triethyl ammonium stearate, sodium stearate, sodium isostearate, potassium stearate, sodium salts of tallow fatty acids, sodium oleate, sodium palmitate, potassium linoleate, sodium laurate, potassium abieate (rosin acid salt), sodium abietate and combinations thereof. Often mixtures of fatty acid salts derived from natural sources such as seed oils or animal fat (such as tallow fatty acids) are used as emulsifiers.

In one aspect, the emulsion polymerized particles of rubber phase material have a weight average particle size of 50 to 800 nanometers ("nm"), more preferably, of from 100 to 500 nm, as measured by light transmission. The size of emulsion polymerized rubber particles can optionally be increased by mechanical, colloidal or chemical agglomeration of the emulsion polymerized particles, according to known techniques.

The rigid thermoplastic phase comprises one or more vinyl derived thermoplastic polymers and exhibits a Tg of greater than 25° C., preferably greater than or equal to 90° C. and even more preferably greater than or equal to 100° C.

In various aspects, the rigid thermoplastic phase comprises a vinyl aromatic polymer having first structural units derived from one or more vinyl aromatic monomers, preferably styrene, and having second structural units derived from one or more monoethylenically unsaturated nitrile monomers, preferably acrylonitrile. In other cases, the rigid phase comprises from 55 to 99 wt. %, still more preferably 60 to 90 wt. %, structural units derived from styrene and from 1 to 45 wt. %, still more preferably 10 to 40 wt. %, structural units derived from acrylonitrile.

The amount of grafting that takes place between the rigid thermoplastic phase and the rubber phase can vary with the relative amount and composition of the rubber phase. In one embodiment, from 10 to 90 wt. %, often from 25 to 60 wt. %, of the rigid thermoplastic phase is chemically grafted to the rubber phase and from 10 to 90 wt. %, preferably from 40 to 75 wt. % of the rigid thermoplastic phase remains "free," i.e., non-grafted.

The rigid thermoplastic phase of the rubber modified thermoplastic resin can be formed solely by emulsion polymerization carried out in the presence of the rubber phase or by addition of one or more separately polymerized rigid thermoplastic polymers to a rigid thermoplastic polymer that has been polymerized in the presence of the rubber phase. In one embodiment, the weight average molecular weight of the one or more separately polymerized rigid thermoplastic polymers is from about 50,000 to about 100,000 g/mol.

In other cases, the rubber modified thermoplastic resin comprises a rubber phase having a polymer with structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers. In one embodiment, the rubber phase of the rubber modified thermoplastic resin comprises a polybutadiene or poly(styrene-butadiene) rubber and the rigid thermoplastic phase comprises a styrene-acrylonitrile copolymer. Vinyl polymers free of alkyl carbon-halogen bond linkages, specifically bromine and chlorine carbon bond linkages can provide melt stability.

In some instances it is desirable to isolate the emulsion vinyl polymer or copolymer by coagulation in acid. In such instances the emulsion polymer can be contaminated by residual acid, or species derived from the action of such acid, for example carboxylic acids derived from fatty acid soaps used to form the emulsion. The acid used for coagulation can be a mineral acid; such as sulfuric acid, hydrochloric acid, nitric acid, phosphoric acid or mixtures thereof. In some cases the acid used for coagulation has a pH less than about 5.

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), methacrylate-butadiene (MB) and styrene-acrylonitrile (SAN). The recycled plastic component can be present in the thermoplastic blend composition in any desired amount. For example, the recycled plastic component can be present in an amount from greater than 0 to less than about 50 parts by weight, including exemplarily amounts of 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, 30 parts by weight, 31 parts by weight, 32 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, and 49 parts by weight. In still further aspects, the recycled plastic component can be present within any range of amount derived from any two of the above states values. For examples, the recycled plastic component can be present in an amount in the range of from about 1 part by weight to 49 parts by weight, or in an amount from 10 parts by weight to about 40 parts by weight, or in amount in the range from about 25 parts by weight to about 35 parts by weight.

Acid Melt Flow Stabilizer

The disclosed thermoplastic polymer blend compositions further comprise an acid melt flow stabilizer component which, as exemplified in the appended examples, minimizes or even eliminates the deterioration of melt flow stability conventionally observed in thermoplastic blend compositions comprising a recycled plastic component. To that end, this improvement is evidenced by the disclosed thermoplastic blend compositions exhibiting a melt flow rate measured at 260° C./2.16 kgf measured accordingly to ASTM D1238 that is lower than that of an identical reference polymer blend composition in the absence of the acid melt flow stabilizer.

According to aspects of the invention, suitable acid melt flow stabilizers include both inorganic and organic acids. Exemplary organic acid melt flow stabilizers include citric acid. Exemplary inorganic acid melt flow stabilizers include phosphoric and phosphorous acid. In still a further aspect, the acid melt flow stabilizer comprises phosphoric acid. In a further aspect, a suitable acid melt flow stabilizer is an acid that does not contain a carboxylic acid functionality. Still further, the acid melt flow stabilizer can comprise boric acid, sulfonic acid, primary phosphate, secondary phosphate, polyphosphoric acid, or any combinations thereof.

The acid melt flow stabilizer component can be present in any desired amount, including for example an amount from greater than 0 parts by weight to 2.0 parts by weight per 100 parts by weight the thermoplastic blend composition. In still a further aspect, the acid melt flow stabilizer can be present in any amount within this range, including for example, 0.1 parts by weight, 0.3, 0.5, 0.7, 0.9, 1.0, 1.1, 1.3, 1.5, 1.7 or 1.9 parts by weight. In still a further aspect, the acid melt flow stabilizer can be present within any range of amounts derived from the above values. For example, the acid melt flow stabilizer can be present in an amount in the range of from greater than 0 to 0.1 parts by weight per 100 parts by weight of the thermoplastic polymer blend composition.

In yet another aspect, the acid melt stabilizer can be present in an amount in the range of from greater than 0 parts by weight to 2.0 parts by weight, wherein all components of the thermoplastic polymer blend composition including the acid melt stabilizer comprise 100 parts by weight. In still a further aspect, the acid melt flow stabilizer can be present in any amount within this range, including for example, 0.1 parts by weight, 0.3, 0.5, 0.7, 0.9, 1.0, 1.1, 1.3, 1.5, 1.7 or 1.9 parts by weight. In still a further aspect, the acid melt flow stabilizer can be present within any range of amounts derived from the above values. For example, the acid melt flow stabilizer can be present in an amount in the range of from greater than 0 to 0.1 parts by weight, wherein all components of the thermoplastic polymer blend composition including the acid melt stabilizer comprise 100 parts by weight.

Flame Retardant

The disclosed thermoplastic polymer blend compositions can optionally further comprises a flame retardant additive. In various aspects, the flame retardant additive can comprise any flame retardant material or mixture of flame retardant materials suitable for use in the inventive thermoplastic compositions. In another aspect, the flame retardant additive comprises a phosphate containing material. In another aspect, the flame retardant additive comprises a halogen containing material. In other aspects, the flame retardant additive is free of or substantially free of one or more of phosphate and/or a halogen. In still another aspect, the flame retardant additive comprises an oligomer organophosphorous flame retardant, including for example, bisphenol A diphenyl phosphate (BPADP). In a further aspect, the flame retardant is selected from oligomeric phosphate, polymeric phosphate, oligomeric phosphonate, or mixed phosphate/phosphonate ester flame retardant compositions. In a still further aspect, the flame retardant is selected from triphenyl phosphate; cresyldiphenylphosphate; tri(isopropylphenyl) phosphate; resorcinol bis(diphenylphosphate); and bisphenol-A bis(diphenyl phosphate). In a yet further aspect, the flame retardant is bisphenol-A bis(diphenyl phosphate).

The concentration of a flame retardant additive can vary, and the present invention is not intended to be limited to any particular flame retardant concentration. In one aspect, the disclosed composition can comprises from greater than 0 to about 30 parts by weight of flame retardant additive, including for example, about 1, 2, 3, 4, 5, 6, 7, 8, 9, 10, 11, 12, 13, 14, 15, 16, 17, 18, 19, 20, 21, 22, 23, 24, 25, 26, 27, 28, or 29 parts by weight. In still further aspects, the flame retardant additive can be present in any range of amounts derived from the above values. For example, the flame retardant additive can be present in the polycarbonate composition in an amount in the range of from about 5 parts by weight to about 15 parts by weight, or event from about 10 parts by weight to about 20 parts by weight. Flame retardant additives are commercially available, and one of skill in the art could readily select an appropriate flame retardant additive.

Other Optional Additives

In addition to the foregoing components, the disclosed thermoplastic polymer blend compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include an antioxidant, a stabilizer (including for example a heat stabilizer, a hydrolytic stabilizer, or a light stabilizer), UV absorbing additive, plasticizer, lubricant, mold release agent, processing aid, antistatic agent, colorant (e.g., pigment and/or dye), or any combination thereof.

In a further aspect, the disclosed polycarbonate blend compositions can further comprise a primary antioxidant or "stabilizer" (e.g., a hindered phenol) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecyl-thiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 wt % to about 1 wt %, optionally about 0.05 wt % to about 0.5 wt % of the polycarbonate blend composition.

In various aspects, the disclosed polycarbonate blend composition further comprises a hydrolytic stabilizer, wherein the hydrolytic stabilizer comprises a hydrotalcite and an inorganic buffer salt. In a further aspect, the disclosed polycarbonate blend composition comprises a hydrolytic stabilizer, wherein the hydrolytic stabilizer comprises one or more hydrotalcites and an inorganic buffer salt comprising one or more inorganic salts capable of pH buffering. Either synthetic hydrotalcites or natural hydrotalcites can be used as the hydrotalcite compound in the present invention. Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation).

In a further aspect, suitable heat stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing heat stabilizers. Heat stabilizers are generally used in amounts of about 0.01 wt % to about 5 wt %, optionally about 0.05 wt % to about 0.3 wt % of the polycarbonate blend composition.

In a further aspect, light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and benzophenones such as 2-hydroxy-4-n-octoxy benzophenone, or the like, or combinations comprising at least one of the foregoing light stabilizers. Light stabilizers are generally used in amounts of about 0.01 wt % to about 10 wt %, optionally about 0.1 wt % to about 1 wt % of the polycarbonate blend composition.

In a further aspect, suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenyl-acryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 wt % to about 5 wt % of the polycarbonate blend composition.

In various aspects, plasticizers, lubricants, and/or mold release agents additives can also be used. There is a considerable overlap among these types of materials, which include, for example, di- or polyfunctional aromatic phosphates such as resorcinol tetraphenyl diphosphate (RDP), the bis(diphenyl)phosphate of hydroquinone and the bis (diphenyl)phosphate of bisphenol-A; poly-alpha-olefins; epoxidized soybean oil; silicones, including silicone oils; esters, for example, fatty acid esters such as medium and high molecular weight alkyl stearyl esters; mixtures of fatty acid esters and hydrophilic and hydrophobic nonionic surfactants comprising polyethylene glycol polymers, polypropylene glycol polymers, and copolymers thereof; waxes such as beeswax, montan wax, paraffin wax or the like. Such materials are generally used in amounts of about 0.1 wt % to about 20 wt %, optionally about 1 wt % to about 10 wt % the polycarbonate blend composition.

In a further aspect, colorants such as pigment and/or dye additives can also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 wt % to about 10 wt %, the polycarbonate blend composition.

In a further aspect, suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3''',5'''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or amounts of about 0.1 to about 10 ppm.

In a further aspect, the anti-drip agents can also be present. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt % PTFE and about 50 wt % SAN, based on the total weight of the encapsulated fluoropolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer.

Manufacture of Blended Polycarbonate Compositions

In various aspects, the thermoplastic polymer blend compositions of the present invention can be manufactured by various methods. The compositions of the present invention can be blended, compounded, or otherwise combined with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 350° C. in the molten resin composition, although higher temperatures can be used provided that the residence time of the resin in the processing equipment is kept short. In a still further aspect, the extruder is typically operated at a temperature of about 180° C. to about 385° C. In a yet further aspect, the extruder is typically operated at a temperature of about 200° C. to about 330° C. In an even further aspect, the extruder is typically operated at a temperature of about 220° C. to about 300° C.

In various aspects, the blended polycarbonate compositions of the present invention can be prepared by blending the polycarbonate, recycled polymer (acrylonitrile-butadiene-styrene (ABS) or recycled polystyrene), acid stabilizer and optionally flame retardant in mixer, e.g., a HENSCHEL-Mixer® high speed mixer or other suitable mixer/blender. Other low shear processes, including but not limited to hand mixing, can also accomplish this blending. The mixture can then be fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch desired polymeric resin and fed into the extruder. The extruder is generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

Articles of Manufacture

In various aspects, the disclosed blended polycarbonate compositions of the present invention can be used in making articles. The disclosed blended polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The blended polycarbonate compositions described herein resins can also be made into film and sheet as well as components of laminate systems. In a further aspect, in an embodiment, a method of manufacturing an article comprises melt blending the polycarbonate polymer composition, the recycled polymer, the acid melt flow stabilizer and optionally the flame retardant and molding the extruded composition into an article. In a still further aspect, the extruding is done with a twin-screw extruder.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed blended polycarbonate compositions. In a further aspect, the article comprising the disclosed blended polycarbonate compositions is used in automotive applications. In a yet further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In an even further aspect, the article comprising the disclosed blended polycarbonate compositions is selected from mobile device exteriors, mobile device covers, enclosures for electrical and electronic assemblies, protective headgear, buffer edging for furniture and joinery panels, luggage and protective carrying cases, small kitchen appliances, and toys.

In one aspect, the present invention pertains to electrical or electronic devices comprising the disclosed blended polycarbonate compositions. In a further aspect, the electrical or electronic device comprising the disclosed blended polycarbonate compositions is a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

Aspects

In various aspects, the present invention pertains to and includes at least the following aspects.

Aspect 1: A thermoplastic polymer blend composition, comprising:
  a) from about 1 to less than about 99 parts by weight of a polycarbonate polymer component;
  b) from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and
  c) an acid melt flow stabilizer;
  wherein the thermoplastic polymer blend composition exhibits a melt flow rate measured at 260° C./2.16 kgf measured accordingly to ASTM D1238 that is lower than that of an identical reference polymer blend composition in the absence of the acid melt flow stabilizer.

Aspect 2: The thermoplastic polymer blend composition of Aspect 1, wherein the polycarbonate polymer component comprises a bisphenol A polycarbonate polymer.

Aspect 3: The thermoplastic polymer blend composition of any one of Aspects 1-2, wherein the polycarbonate polymer component further comprises a polycarbonate-polysiloxane copolymer.

Aspect 4: The thermoplastic polymer blend composition of any one of Aspects 1-3, further comprising from greater than 0 to about 30 parts by weight of a flame retardant.

Aspect 5: The thermoplastic polymer blend composition of any one of Aspects 1-4, wherein the acid melt flow stabilizer comprises an organic acid.

Aspect 6: The thermoplastic polymer blend composition of any one of Aspects 1-5, wherein the organic acid comprises citric acid.

Aspect 7: The thermoplastic polymer blend composition of any one of Aspects 1-6, wherein the acid melt flow stabilizer comprises an inorganic acid.

Aspect 8: The thermoplastic polymer blend composition of any one of Aspects 1-7, wherein the inorganic acid comprises phosphoric acid, phosphorous acid, or a combination thereof Aspect 9: The thermoplastic polymer blend composition of any one of Aspects 1-8, wherein the acid melt flow stabilizer is present in an amount from greater than 0 to about 2.0 parts by weight per 100 parts by weight of the thermoplastic polymer blend composition.

Aspect 10: The thermoplastic polymer blend composition of any one of Aspects 1-9, wherein a molded article formed from the thermoplastic polymer blend composition exhibits a notched Izod impact that is greater than that of an identical reference polymer blend composition in the absence of the acid melt flow stabilizer.

Aspect 11: The thermoplastic polymer blend composition of any one of Aspects 1-10, comprising:
  a) from about 65 to less than about 75 parts by weight of at least one bisphenol A polycarbonate polymer;
  b) from about 25 to less than about 35 parts by weight of the at least one recycled polymer;
  c) from greater than 0 to about 0.1 parts by weight of the acid melt flow stabilizer per 100 parts by weight of the thermoplastic blend composition.

Aspect 12: The thermoplastic polymer blend composition of any one of Aspects 1-11, comprising
  a) from about 60 to about 80 parts by weight of at least one bisphenol A polycarbonate polymer;
  b) from about 10 to less than about 30 parts by weight of the at least one recycled polymer;
  c) from greater than 0 to about 0.1 parts by weight of the acid melt flow stabilizer, and
  d) from about 5 to about 20 parts by weight of a flame retardant, wherein total amounts of (a) through (d) are 100 parts by weight.

Aspect 13: A thermoplastic polymer blend composition, comprising:
  a) from about 1 to less than about 99 parts by weight of a polycarbonate polymer component;
  b) from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity selected from iron, aluminum, copper, magnesium, calcium and polyurethane particle in an amount in the range from at least about 10 ppm to about 10000 ppm;
  c) an acid melt flow stabilizer.

Aspect 14: A thermoplastic polymer blend composition, comprising:
  a) a polycarbonate polymer component;
  b) at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and
  c) an acid melt flow stabilizer, wherein the acid melt flow stabilizer does not comprise a carboxylic acid;
  wherein the thermoplastic polymer blend composition exhibits a melt flow rate measured at 260° C./2.16 kgf that is lower than that of an identical reference polymer blend composition in the absence of the acid melt flow stabilizer.

Aspect 15: The thermoplastic polymer blend composition Aspect 14, comprising:

a) from about 1 to less than about 99 parts by weight of the polycarbonate polymer component;
b) from about 1 to about 50 parts by weight of the at least one recycled polymer; and
c) from greater than 0 to about 2 parts by weight of the acid melt flow stabilizer per 100 parts by weight of the thermoplastic polymer blend.

Aspect 16: The thermoplastic polymer blend composition of any one of Aspects 14-15, wherein the polycarbonate polymer component comprises a bisphenol A polycarbonate polymer.

Aspect 17: The thermoplastic polymer blend composition of any one of Aspects 14-16, wherein the polycarbonate polymer component further comprises a polycarbonate-polysiloxane copolymer.

Aspect 18: The thermoplastic polymer blend composition of any one of Aspects 14-17, wherein a molded article formed from the thermoplastic polymer blend composition exhibits a notched Izod impact that is greater than that of an identical reference polymer blend composition in the absence of the acid melt flow stabilizer.

Aspect 19: The thermoplastic polymer blend composition Aspect 15, comprising:
a) from about 65 to less than about 75 parts by weight of at least one bisphenol A polycarbonate polymer;
b) from about 25 to less than about 35 parts by weight of the at least one recycled polymer; and
c) from greater than 0 to about 0.1 parts by weight of the inorganic acid melt flow stabilizer per 100 parts of the composition.

Aspect 20: A molded article formed from the composition of any one of Aspects 1-18.

Aspect 21: A method of forming a thermoplastic polymer blend composition comprising:
combining:
i) from about 1 to less than about 99 parts by weight of a polycarbonate polymer component;
ii) from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and
iii) an acid melt flow stabilizer;
to form the thermoplastic polymer blend composition;
wherein the formed thermoplastic polymer blend composition exhibits a melt flow rate measured at 260° C./2.16 kgf measured accordingly to ASTM D1238 that is lower than that of an identical reference polymer blend composition in the absence of the acid melt flow stabilizer.

Aspect 22: The method of Aspect 21, further comprising step of extruding the thermoplastic polymer blend composition.

Aspect 23: The method of any one of Aspects 21-22, wherein the polycarbonate polymer component comprises a bisphenol A polycarbonate polymer.

Aspect 24: The method of any one of Aspects 21-23, wherein the polycarbonate polymer component further comprises a polycarbonate-polysiloxane copolymer.

Aspect 25: The method of any one of Aspects 21-24, wherein the acid melt flow stabilizer comprises an organic acid further comprising citric acid.

Aspect 26: The method of any one of Aspects 21-25, wherein the acid melt flow stabilizer comprises an inorganic acid further comprising one or more phosphorous acid, phosphoric acid, or a combination thereof.

Aspect 27: The method of any one of Aspects 21-26, wherein the acid melt flow stabilizer is provided in an amount from greater than 0 to about 2.0 parts by weight per 100 parts by weight of the thermoplastic polymer blend composition.

Aspect 28: The method of any one of Aspects 21-27, wherein a molded article formed from the thermoplastic polymer blend composition exhibits a notched Izod impact that is greater than that of an identical reference polymer blend composition formed in the absence of the acid melt flow stabilizer.

Aspect 29: The method of any one of Aspects 21-28, comprising:
combining:
i) from about 65 to less than about 75 parts by weight of at least one bisphenol A polycarbonate polymer;
ii) from about 25 to less than about 35 parts by weight of the at least one recycled polymer, and
iii) from greater 0 to about 0.1 parts by weight of the acid melt flow stabilizer;
to form the thermoplastic polymer blend composition per 100 parts of the thermoplastic polymer blend composition.

Aspect 30: The method of any one of Aspects 21-29, wherein the acid melt flow stabilizer does not comprise a carboxylic acid.

Aspect 31: The method of any one of Aspects 21-30, comprising:
combining:
i) from about 1 to less than about 99 parts by weigh of the polycarbonate polymer component;
ii) from about 1 to about 50 parts by weight of the at least one recycled polymer; and
iii) providing from greater than 0 to about 2 parts by weight of the inorganic acid melt flow stabilize per 100 parts by weight of the thermoplastic polymer blend;
to form the thermoplastic polymer blend composition.

Aspect 32: The method of any one of Aspects 21-31, comprising:
combining:
i) from about 65 to less than about 75 parts by weight of at least one bisphenol A polycarbonate polymer;
ii) from about 25 to less than about 35 parts by weight of the at least one recycled polymer; and
iii) from greater than 0 to about 0.1 parts by weight of the inorganic acid melt flow stabilizer per 100 parts by weight of the thermoplastic polymer blend;
to form the thermoplastic polymer blend composition.

Aspect 33: A method of forming a thermoplastic polymer blend composition, comprising:
combining
i) from about 1 to less than about 99 parts by weight of a polycarbonate polymer component;
ii) from about 1 to less than about 50 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity selected from iron, aluminum, copper, magnesium, calcium and polyurethane particles in an amount of at least about 10 ppm; and
iii) an acid melt flow stabilizer;
to form the thermoplastic polymer blend composition.

Aspect 34: A thermoplastic polymer blend composition, comprising:
a) from about 1 to about 99 parts by weight of a polycarbonate polymer component;
b) from about 1 to less than about 50 parts by weight of a recycled acrylonitrile-butadiene-styrene (ABS) polymer, wherein the recycled acrylonitrile-butadiene-styrene polymer comprises at least one impurity not present in an identical virgin acrylonitrile-butadiene-styrene (ABS) polymer; and
c) an acid melt flow stabilizer;
wherein the thermoplastic polymer blend composition exhibits a melt flow rate measured at 260° C./2.16 kgf measured accordingly to ASTM D1238 that is lower than that of an identical reference polymer blend composition in the absence of the acid melt flow stabilizer.

Aspect 35: The thermoplastic polymer blend composition of Aspect 34, wherein the polycarbonate polymer component comprises a bisphenol A polycarbonate polymer.

Aspect 36: The thermoplastic polymer blend composition of any of Aspects 34-35, wherein the polycarbonate polymer component comprises at least two different bisphenol A polycarbonate polymers.

Aspect 37: The thermoplastic polymer blend composition of any of Aspects 34-36, wherein the polycarbonate polymer component comprises a polycarbonate-polysiloxane copolymer.

Aspect 38: The thermoplastic polymer blend composition of any of Aspects 34-37, further comprising from greater than 0 to about 30 parts by weight of a flame retardant.

Aspect 39: The thermoplastic polymer blend composition of any of Aspects 34-38, wherein the acid melt flow stabilizer comprises an organic acid.

Aspect 40: The thermoplastic polymer blend composition of any of Aspects 34-39, wherein the acid melt flow stabilizer comprises citric acid.

Aspect 41: The thermoplastic polymer blend composition of any of Aspects 34-40, wherein the acid melt flow stabilizer comprises an inorganic acid.

Aspect 42: The thermoplastic polymer blend composition of any of Aspects 34-31, wherein the acid melt flow stabilizer comprises phosphorous acid.

Aspect 43: The thermoplastic polymer blend composition of any of Aspects 34-42, wherein the acid melt flow stabilizer comprises phosphoric acid.

Aspect 44: The thermoplastic polymer blend composition of any of Aspects 34-43, wherein the acid melt flow stabilizer is present in an amount from greater than 0 to about 2.0 parts by weight of the thermoplastic polymer blend composition.

Aspect 45: The thermoplastic polymer blend composition of any of Aspects 34-44, wherein a molded article formed from the thermoplastic polymer blend composition exhibits a notched Izod impact that is greater than that of an identical reference polymer blend composition in the absence of the acid melt flow stabilizer.

Aspect 46: The thermoplastic polymer blend composition of any of Aspects 34-45, comprising:
a) from about 65 to about 75 parts by weight of at least one bisphenol A polycarbonate polymer;
b) from about 25 to less than about 35 parts by weight of a recycled acrylonitrile-butadiene-styrene (ABS) polymer, wherein the recycled acrylonitrile-butadiene-styrene polymer comprises at least one impurity not present in an identical virgin acrylonitrile-butadiene-styrene (ABS) polymer; and
c) from greater than 0 to 0.1 parts by weight of an acid melt flow stabilizer.

Aspect 47: A thermoplastic polymer blend composition, comprising:
a) a polycarbonate polymer component;
b) a recycled acrylonitrile-butadiene-styrene (ABS) polymer, wherein the recycled acrylonitrile-butadiene-styrene polymer comprises at least one impurity not present in an identical virgin acrylonitrile-butadiene-styrene (ABS) polymer; and
c) an acid melt flow stabilizer, wherein the acid melt flow stabilizer does not comprise a carboxylic acid;
wherein the thermoplastic polymer blend composition exhibits a melt flow rate measured at 260° C./2.16 kgf that is lower than that of an identical reference polymer blend composition in the absence of the acid melt flow stabilizer.

Aspect 48: The thermoplastic polymer blend composition of Aspect 47, comprising:
a) from about 1 to about 99 parts by weight of a polycarbonate polymer component;
b) from about 1 to about 50 parts by weight of a recycled acrylonitrile-butadiene-styrene (ABS) polymer, wherein the recycled acrylonitrile-butadiene-styrene polymer comprises at least one impurity not present in an identical virgin acrylonitrile-butadiene-styrene (ABS) polymer; and
c) from greater than 0 to about 2 parts by weight of the inorganic acid melt flow stabilizer.

Aspect 49: The thermoplastic polymer blend composition of any of Aspects 47-48, wherein the polycarbonate polymer component comprises a bisphenol A polycarbonate polymer.

Aspect 50: The thermoplastic polymer blend composition of any of Aspects 47-49, wherein the polycarbonate polymer component comprises at least two different bisphenol A polycarbonate polymers.

Aspect 51: The thermoplastic polymer blend composition of any of Aspects 47-50, wherein the polycarbonate polymer component comprises a polycarbonate-polysiloxane copolymer.

Aspect 52: The thermoplastic polymer blend composition of any of Aspects 47-51, further comprising from greater than 0 to about 30 parts by weight of a flame retardant.

Aspect 53: The thermoplastic polymer blend composition of any of Aspects 47-52, wherein the acid melt flow stabilizer comprises phosphorous acid.

Aspect 54: The thermoplastic polymer blend composition of any of Aspects 47-53, wherein the acid melt flow stabilizer comprises phosphoric acid.

Aspect 55: The thermoplastic polymer blend composition of any of Aspects 47-54, wherein a molded article formed from the thermoplastic polymer blend composition exhibits a notched Izod impact that is greater than that of an identical reference polymer blend composition in the absence of the acid melt flow stabilizer.

Aspect 56: The thermoplastic polymer blend composition of any of Aspects 47-55, comprising:
a) from about 65 to about 75 parts by weight of at least one bisphenol A polycarbonate polymer;
b) from about 25 to less than about 35 parts by weight of a recycled acrylonitrile-butadiene-styrene (ABS) polymer, wherein the recycled acrylonitrile-butadiene-styrene polymer comprises at least one impurity not present in an identical virgin acrylonitrile-butadiene-styrene (ABS) polymer; and
c) from greater than 0 to about 0.1 parts by weight of an inorganic acid melt flow stabilizer.

Aspect 57: A thermoplastic polymer blend composition, comprising:
- a) from about 1 to about 99 parts by weight of a polycarbonate polymer;
- b) recycled polystyrene polymer comprises at least one impurity not present in an identical virgin polystyrene polymer; and
- c) an acid melt flow stabilizer;
- wherein the thermoplastic polymer blend composition exhibits a melt flow rate measured at 260° C./2.16 kgf that is lower than that of an identical reference polymer blend composition in the absence of the acid melt flow stabilizer.

Aspect 58: The thermoplastic polymer blend composition of Aspect 57, wherein the polycarbonate polymer component comprises a bisphenol A polycarbonate polymer.

Aspect 59: The thermoplastic polymer blend composition of any of Aspects 57-58, wherein the polycarbonate polymer component comprises at least two different bisphenol A polycarbonate polymers.

Aspect 60: The thermoplastic polymer blend composition of any of Aspects 57-59, wherein the polycarbonate polymer component comprises a polycarbonate-polysiloxane copolymer.

Aspect 61: The thermoplastic polymer blend composition of any of Aspects 57-60, further comprising from greater than 0 to about 30 parts by weight of a flame retardant.

Aspect 62: The thermoplastic polymer blend composition of any of Aspects 57-61, wherein the acid melt flow stabilizer comprises an organic acid.

Aspect 63: The thermoplastic polymer blend composition of any of Aspects 57-62, wherein the acid melt flow stabilizer comprises citric acid.

Aspect 64: The thermoplastic polymer blend composition of any of Aspects 57-63, wherein the acid melt flow stabilizer comprises an inorganic acid.

Aspect 65: The thermoplastic polymer blend composition of any of Aspects 57-64, wherein the acid melt flow stabilizer comprises phosphorous acid.

Aspect 66: The thermoplastic polymer blend composition of any of Aspects 57-65, wherein the acid melt flow stabilizer comprises phosphoric acid.

Aspect 67: The thermoplastic polymer blend composition of any of Aspects 57-66, wherein the acid melt flow stabilizer is present in an amount from greater than 0 to about 2.0 parts by weight of the thermoplastic polymer blend composition.

Aspect 68: The thermoplastic polymer blend composition of any of Aspects 57-68, wherein a molded article formed from the thermoplastic polymer blend composition exhibits a notched Izod impact that is greater than that of an identical reference polymer blend composition in the absence of the acid melt flow stabilizer.

Aspect 69: The thermoplastic polymer blend composition of any of Aspects 34-68, comprising:
- a) from about 65 to about 75 parts by weight of at least one bisphenol A polycarbonate polymer;
- b) from about 25 to about 35 parts by weight of a recycled polystyrene polymer, wherein the recycled polystyrene polymer comprises at least one impurity not present in an identical virgin polystyrene polymer; and
- c) from greater than 0 to about 0.1 parts by weight of an acid melt flow stabilizer.

Aspect 70: A molded article formed from the composition of any of Aspects 34 through 69.

Aspect 71: A method of forming a thermoplastic polymer blend composition comprising:
- a) combining:
  - i) from about 1 to about 99 parts by weight of a polycarbonate polymer component;
  - ii) from about 1 to less than about 50 parts by weight of a recycled acrylonitrile-butadiene-styrene (ABS) polymer, wherein the recycled acrylonitrile-butadiene-styrene polymer comprises at least one impurity not present in an identical virgin acrylonitrile-butadiene-styrene (ABS) polymer; and
  - iii) an acid melt flow stabilizer;
- to form the thermoplastic polymer blend composition;
- wherein the formed thermoplastic polymer blend composition exhibits a melt flow rate measured at 260° C./2.16 kgf measured accordingly to ASTM D1238 that is lower than that of an identical reference polymer blend composition in the absence of the acid melt flow stabilizer.

Aspect 72: The method of Aspect 71, further comprising step b) extruding the thermoplastic polymer blend composition.

Aspect 73: The method of any of Aspects 71-72, wherein the polycarbonate polymer component comprises a bisphenol A polycarbonate polymer.

Aspect 74: The method of any of Aspects 71-73, wherein the polycarbonate polymer component comprises at least two different bisphenol A polycarbonate polymers.

Aspect 75: The method of any of Aspects 71-74, wherein the polycarbonate polymer component comprises a polycarbonate-polysiloxane copolymer.

Aspect 76: The method of any of Aspects 71-75, wherein the thermoplastic polymer blend composition further comprising from greater than 0 to about 30 parts by weight of a flame retardant.

Aspect 77: The method of any of Aspects 71-76, wherein the acid melt flow stabilizer comprises an organic acid.

Aspect 78: The method of any of Aspects 71-77, wherein the acid melt flow stabilizer comprises citric acid.

Aspect 79: The method of any of Aspects 71-78, wherein the acid melt flow stabilizer comprises an inorganic acid.

Aspect 80: The method of any of Aspects 71-79, wherein the acid melt flow stabilizer comprises phosphorous acid.

Aspect 81: The method of any of Aspects 71-80, wherein the acid melt flow stabilizer comprises phosphoric acid.

Aspect 82: The method of any of Aspects 71-81, wherein the acid melt flow stabilizer is provided in an amount from greater than 0 to about 2.0 parts by weight of the thermoplastic polymer blend composition.

Aspect 83: The method of any of Aspects 71-82, further comprising step of drying.

Aspect 84: The method of any of Aspects 71-83, further comprising step of molding the thermoplastic polymer blend composition into a molded article.

Aspect 85: The method of any of Aspects 71-84, wherein a molded articled formed from the thermoplastic polymer blend composition exhibits a notched Izod impact that is greater than that of an identical reference polymer blend composition formed in the absence of the acid melt flow stabilizer.

Aspect 86: A method of any of Aspects 71-85, comprising:
- a) combining:
  - i) from about 65 to about 75 parts by weight of at least one bisphenol A polycarbonate polymer;
  - ii) from about 25 to less than about 35 parts by weight of a recycled acrylonitrile-butadiene-styrene (ABS) polymer, wherein the recycled acrylonitrile-butadiene-styrene (ABS) polymer comprises at least on impurity not present in an identical virgin acrylonitrile-butadiene-styrene (ABS) polymer; and
iii) from greater 0 to about 0.1 parts by weight of an acid melt flow stabilizer; to form the thermoplastic polymer blend composition.

Aspect 87: The method of any of Aspects 71-86, further comprising step b) extruding the thermoplastic polymer blend composition.

Aspect 88: The method of Aspects 71-87, further comprising step of drying.

Aspect 89: The method of any of Aspects 71-88, further comprising step of molding the thermoplastic polymer blend composition into a molded article.

Aspect 90: A method of forming a thermoplastic polymer blend composition, comprising:
a) combining:
i) a polycarbonate polymer component;
ii) a recycled acrylonitrile-butadiene-styrene (ABS) polymer, wherein the recycled acrylonitrile-butadiene-styrene (ABS) polymer comprises at least one impurity not present in an identical virgin acrylonitrile-butadiene-styrene (ABS) polymer; and
iii) an acid melt flow stabilizer, wherein the acid melt flow stabilizer does not comprise a carboxylic acid; to form the thermoplastic polymer blend composition;
and wherein the formed thermoplastic polymer blend composition exhibits a melt flow rate measured at 260° C./2.16 kgf that is lower than that of an identical reference polymer blend composition in the absence of the acid melt flow stabilizer.

Aspect 91: The method of Aspect 90, further comprising step b) extruding the thermoplastic polymer blend composition.

Aspect 92: The method of any of Aspects 90-91, further comprising step of drying.

Aspect 93: The method of any of Aspects 90-92, further comprising step of molding the thermoplastic polymer blend composition into a molded article.

Aspect 94: The method of any of Aspects 90-93, comprising:
a) combining:
i) from about 1 to about 99 parts by weigh of a polycarbonate polymer component;
ii) from about 1 to about 50 parts by weight of a recycled acrylonitrile-butadiene-styrene (ABS) polymer, wherein the recycled acrylonitrile-butadiene-styrene (ABS) polymer comprises at least one impurity not present in an identical virgin acrylonitrile-butadiene-styrene (ABS) polymer; and
iii) providing from greater than 0 to about 2 parts by weight of the inorganic acid melt flow stabilizer; to form the thermoplastic polymer blend composition.

Aspect 95: The method of any of Aspects 90-94, further comprising step b) extruding the thermoplastic polymer blend composition.

Aspect 96: The method of any of Aspects 90-95, wherein the polycarbonate polymer component comprises a bisphenol A polycarbonate polymer.

Aspect 97: The method of any of Aspects 90-96, wherein the polycarbonate polymer component comprises at least two different bisphenol A polycarbonate polymers.

Aspect 98: The method of any of Aspects 90-97, wherein the polycarbonate polymer component comprises a polycarbonate-polysiloxane copolymer.

Aspect 99: The method of any of Aspects 90-98, wherein the thermoplastic polymer blend composition further comprising from greater than 0 to about 30 parts by weight of a flame retardant.

Aspect 100: The method of any of Aspects 90-99, wherein the acid melt flow stabilizer comprises phosphorous acid.

Aspect 101: The method of any of Aspects 90-100, wherein the acid melt flow stabilizer comprises phosphoric acid.

Aspect 102: The method of any of Aspects 90-101, further comprising step of drying.

Aspect 103: The method of any of Aspects 90-103, further comprising step of molding the thermoplastic polymer blend composition into a molded article.

Aspect 104: The method of any of Aspects 90-104, wherein a molded article formed from the thermoplastic polymer blend composition exhibits a notched Izod impact that is greater than that of an identical reference polymer blend composition in the absence of the acid melt flow stabilizer.

Aspect 105: The method of any of Aspects 90-104, comprising:
a) combining:
i) from about 65 to about 75 parts by weight of at least one bisphenol A polycarbonate polymer;
ii) from about 25 to less than about 35 parts by weight of a recycled acrylonitrile-butadiene-styrene (ABS) polymer, wherein the recycled acrylonitrile-butadiene-styrene (ABS) polymer comprises at least one impurity not present in an identical virgin acrylonitrile-butadiene-styrene (ABS) polymer; and
iii) from greater than 0 to about 0.1 parts by weight of an inorganic acid melt flow stabilizer to form the thermoplastic polymer blend composition.

Aspect 106: The method of any of Aspects 90-105, further comprising step b) extruding the thermoplastic polymer blend composition.

Aspect 107: A method of forming a thermoplastic polymer blend composition, comprising:
a) combining:
i) from about 1 to about 99 parts by weight of a polycarbonate polymer;
ii) from about 1 to about 50 parts by weight of a recycled polystyrene (PS) polymer, wherein the recycled polystyrene polymer comprises at least one impurity not present in an identical virgin polystyrene polymer; and
iii) an acid melt flow stabilizer; to form the thermoplastic polymer blend composition;
wherein the formed thermoplastic polymer blend composition exhibits a melt flow rate measured at 260° C./2.16 kgf that is lower than that of an identical reference polymer blend composition in the absence of the acid melt flow stabilizer.

Aspect 108: The method of Aspect 107, further comprising step b) extruding the thermoplastic polymer blend composition.

Aspect 109: The method of any of Aspects 107-108, wherein the polycarbonate polymer component comprises a bisphenol A polycarbonate polymer.

Aspect 110: The method of any of Aspects 107-109, wherein the polycarbonate polymer component comprises at least two different bisphenol A polycarbonate polymers.

Aspect 111: The method of any of Aspects 107-110, wherein the polycarbonate polymer component comprises a polycarbonate-polysiloxane copolymer.

Aspect 112: The method of any of Aspects 107-111, wherein the thermoplastic polymer blend composition further comprising from greater than 0 to about 30 parts by weight of a flame retardant.

Aspect 113: The method of any of Aspects 107-112, wherein the acid melt flow stabilizer comprises an organic acid.

Aspect 114: The method of any of Aspects 107-113, wherein the acid melt flow stabilizer comprises citric acid.

Aspect 115: The method of any of Aspects 107-114, wherein the acid melt flow stabilizer comprises an inorganic acid.

Aspect 116: The method of any of Aspects 107-115, wherein the acid melt flow stabilizer comprises phosphorous acid.

Aspect 117: The method of any of Aspects 107-116, wherein the acid melt flow stabilizer comprises phosphoric acid.

Aspect 118: The method of any of Aspects 107-117, wherein the acid melt flow stabilizer is provided in an amount from greater than 0 to about 2.0 parts by weight of the thermoplastic polymer blend composition.

Aspect 119: The method of any of Aspects 107-118, further comprising step of drying.

Aspect 120: The method of any of Aspects 107-119, further comprising step of molding the thermoplastic polymer blend composition into a molded article.

Aspect 121: The method of any of Aspects 107-120, wherein a molded article formed from the thermoplastic polymer blend composition exhibits a notched Izod impact that is greater than that of an identical reference polymer blend composition in the absence of the acid melt flow stabilizer.

Aspect 122: The method of any of Aspects 107-121, comprising:
 a) combining:
  i) from about 65 to about 75 parts by weight of at least one bisphenol A polycarbonate polymer;
  ii) from about 25 to about 35 parts by weight of a recycled polystyrene polymer, wherein the recycled polystyrene polymer comprises at least one impurity not present in an identical virgin polystyrene polymer; and
  iii) from greater than 0 to about 0.1 parts by weight of an acid melt flow stabilizer to form the thermoplastic polymer blend composition.

Aspect 123: The method of any of Aspects 107-122, further comprising step b) extruding the thermoplastic polymer blend composition.

Aspect 124: The method of any of Aspects 107-123, further comprising step of drying.

Aspect 125: The method of any of Aspects 107-124, further comprising step of molding the thermoplastic polymer blend composition into a molded article.

Aspect 126: The thermoplastic polymer blend composition Aspect 14, comprising:
 a) from about 1 to less than about 99 parts by weight of the polycarbonate polymer component;
 b) from about 1 to about 50 parts by weight of the at least one recycled polymer; and
 c) from greater than 0 to about 2 parts by weight of the acid melt flow stabilizer, wherein the total amounts of (a) through (c) are 100 parts by weight.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in degrees Celsius (° C.) or is at ambient temperature, and pressure is at or near atmospheric.
General Materials and Methods The raw materials used in Examples below were pre-blended together in a super floater mixer. All samples described herein were prepared via melt extrusion by feeding a pre-blend polymer mixture into a 44 mm Twin Screw Extruder with co-rotating twin screw with a barrel temperature of 260° C., a screw speed of about 300 rpm, and with a throughput rate of 100 kg/hour. The 44 mm Twin Screw Extruder was operated under standard processing conditions well known to one skilled in the art. In some examples described below, a flame retardant was fed into the extruder through an independent liquid feeder to produce mixtures comprising the flame retardant.

Pellets of thermoplastic polymer blend compositions were formed via extrusion and were dried at about 80° C. for at least four hours prior to molding the pellets into test samples. The injection molding conditions were carried out at a barrel temperature of 235° C. and a mold temperature of 60° C.

The molecular weight of the thermoplastic polymer blend compositions was determined as follows: (1) preparing a solution of pellets, typically 75 mg, in 20 mL of chloroform ($CHCl_3$); (2) filtering the solution using a 0.2 micron PTFE filter; and (3) performing Gel Permeation Chromatography (GPC) (TOSOH HLC-8320GPC) on the filtered solution to measure the number average molecular weight ($M_n$) and the weight average molecular weight ($M_w$) based on PS standard.

The heat deflection temperature ("HDT") was determined using the ASTM D648 standard at 1.82 MPa. The HDT is reported in units of ° C.

The notched Izod impact ("NII") test was carried out on 3.2 mm bars according to ASTM D 256 at 23° C.

Flexural properties (modulus and strength) were measured using 6.4 mm bars in accordance with ASTM 790. Flexural strength at yield ("F/S") and flexural modulus ("F/M") are reported in units of $kg/cm^2$.

Tensile properties (strength at yield and elongation at break) were measured on 3.2 mm bars in accordance with ASTM D638. Tensile strength at yield ("T/S") is reported in units of $kg/cm^2$ and tensile elongation at break ("T/E") is reported in %.

The melt flow rate ("MFR") was measured at a 260° C./2.16 kgf load in accordance with ASTM D1238. The MFR is reported in units of g/10 min.

Raw Materials

The compositions in the Examples below were prepared from the components described in Table 1. The performance of the recycled polycarbonate blend composites was tested with and without the addition of an acid melt flow stabilizer additive as described below.

Example Set 1

Five reference samples (Comparative Example 1 through Comparative Example 5) and four working samples (Working Example 1-Working Example 4) were prepared according to the procedures described above. The formulations of these samples are shown in Table 2. Table 2 also shows the performance results of the polycarbonate blend compositions which were tested with and without the addition of an acid melt flow stabilizer additive.

Working Example 1 (with citric acid as an acid melt flow stabilizer additive) has a significantly lower MFR compared to the MFR of the identical reference polymer blend composition (Comparative Example 3—without citric acid as an acid melt flow stabilizer additive). Working Example 1 also has a significantly higher notched Izod impact compared to the identical reference polymer blend composition (Comparative Example 3). Working Example 1 also has higher $M_n$ and $M_w$ compared to the identical reference polymer blend composition (Comparative Example 3).

Working Examples 2-4 show that the concentration of the acid melt flow stabilizer impacts the melting properties of the thermoplastic polymer blend composition. Furthermore, the MFR decreases with increasing concentrations of phosphoric acid (acid melt flow stabilizer), see Working Examples 2-4 compared to Comparative Example 3. Working Examples 2-4 also have significantly higher notched Izod impact compared to the identical reference polymer blend composition (Comparative Example 3).

The improvement in the melting properties of the thermoplastic polymer blend composition by the addition of the acid melt flow stabilizer did not affect other mechanical or physical properties of the blend, i.e. the tensile and flexural properties, as well as the HDT were not significantly affected by the addition of citric acid as the acid melt flow stabilizer (Comparative Example 3 vs. Working Example 1).

TABLE 1

| Component | Item Code | Trade Name/Supplier | Chemical Name | Additional information |
|---|---|---|---|---|
| PC Resin | PC-1 | SABIC | PC | Mw: 29500-30300 |
|  | PC-2 | SABIC | PC | Mw: 21600-22200 |
|  | PC-3 | SABIC | PC-PDMS copolymer | 80% PC, 20% Siloxane copolymer |
| Virgin Resin | ABS-1 | AT-07/Nippon A&L | Bulk ABS | MFI (260° C., 2.16 kg): 17 g/10 min |
|  | ABS-2 | UX050/UMG ABS | Emulsion ABS |  |
|  | SAN | STYLAC-AS 789A/Asahi Kasei | SAN |  |
| PCR-Resin | PCR-ABS-1 | NS-A4ST03/Green Circle Systems | ABS (post-consumer recycle) | MFI (260° C., 2.16 kg): 4 g/10 min |
|  | PCR-ABS-2 | ABS 4134/MBA Polymer | ABS (post-consumer recycle) | MFI (260° C., 2.16 kg): 11 g/10 min |
|  | PCR-PS | Extruded pellet of NPS/Green Circle Systems | PS (post-consumer recycle) | NPS1 crushed flake was extruded through 80 mesh screen |
| PIR-Resin | PIR-ABS |  | ABS (post industry recycle) |  |
| Acid | CA-1 | Citric Acid Anhydrous/Sun Chemical | Citric Acid |  |
|  | PA-1 | 50% Arinsan/OhmichiSeiyaki | Phosphorous Acid | 50% aqueous solution |
|  | PA-2 | 75% Rinsan/Yoneyama Kagaku | Phosphoric Acid | 75% aqueous solution |
| Additive | PFR | CR741S/Daihachi | Bisphenol-A diphosphate |  |
|  | PETS | /FACI SPA | Pentaerythritoltetraste arate |  |
|  | STAB-1 | EVERFOS-168/Everspring Chemical | Tris(2,4-di-t-butyl phenyl)phosphite |  |
|  | STAB-2 | EVERNOX-76/Everspring Chemical | n-octadecyl-3-(4'-hydroxy-3',5'-di-tert-butyl phenyl)propinonate |  |
|  | PTFE | F449/SABIC | PTFE/SAN | 50% PTFE/50% SAN mixture |
|  | CB | Black Pearls800/Cabot | Carbon Black |  |

TABLE 2

|  |  | Comp. Ex 1 | Comp. Ex 2 | Comp. Ex 3 | Comp. Ex 4 | Comp. Ex 5 | Work. Ex 1 | Work. Ex 2 | Work. Ex 3 | Work. Ex 4 |
|---|---|---|---|---|---|---|---|---|---|---|
| PC-2 | | 70 | 70 | 70 | 70 | 70 | 70 | 70 | 70 | 70 |
| ABS-1 | | 30 | | | | 30 | | | | |
| ABS-2 | | | 12 | | | | 12 | | | |
| SAN | | | 18 | | | | 18 | | | |
| PCR-ABS-1 | | | | 30 | | | | 30 | 30 | 30 | 30 |
| CA | | | | | 0.1 | | 0.1 | 0.1 | | |
| PA-1 | | | | | | | | 0.01 | 0.03 | 0.05 |
| N. Izod | kg-cm/cm | 53 | 57 | 8 | 61 | 57 | 35 | 22 | 35 | 39 |
| T/S | kg/cm$^2$ | 533 | 585 | 585 | 551 | 586 | 587 | 580 | 580 | 582 |
| T/E | % | 88 | 105 | 17 | 81 | 121 | 18 | 18 | 19 | 25 |
| F/S | kg/cm$^2$ | 799 | 879 | 888 | 786 | 857 | 874 | 897 | 897 | 895 |
| F/M | kg/cm$^2$ | 22252 | 23571 | 24678 | 22210 | 23776 | 24634 | 24365 | 24436 | 24339 |
| HDT, 1.8 MPa | °C. | 115 | 115 | 111 | 114 | 113 | 112 | 107 | 109 | 110 |
| MFR, 260° C./2.16 kgf | g/10 min | 16 | 9 | 28 | 14 | 9 | 15 | 25 | 21 | 18 |
| CHCl$_3$ soluble resin M$_n$ | | 19895 | 19108 | 16477 | 20359 | 19554 | 19753 | | | |
| CHCl$_3$ soluble resin M$_w$ | | 43390 | 45324 | 41065 | 44444 | 46186 | 47323 | | | |

Figure 2:
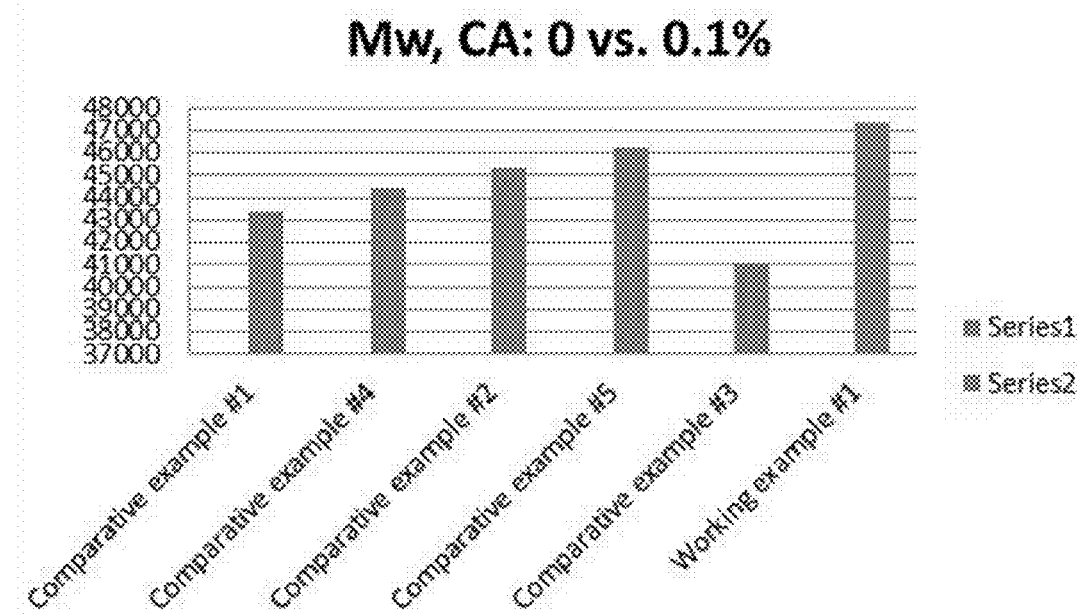
FIG. 2 is a schematic representation of the effect of citric acid (Working Example 1), as an acid melt flow stabilizer additive, on a weight average molecular weight ($M_w$) of the thermoplastic polymer blend composition as compared to the comparator examples Comparative Examples 1-5.
Figure 3:
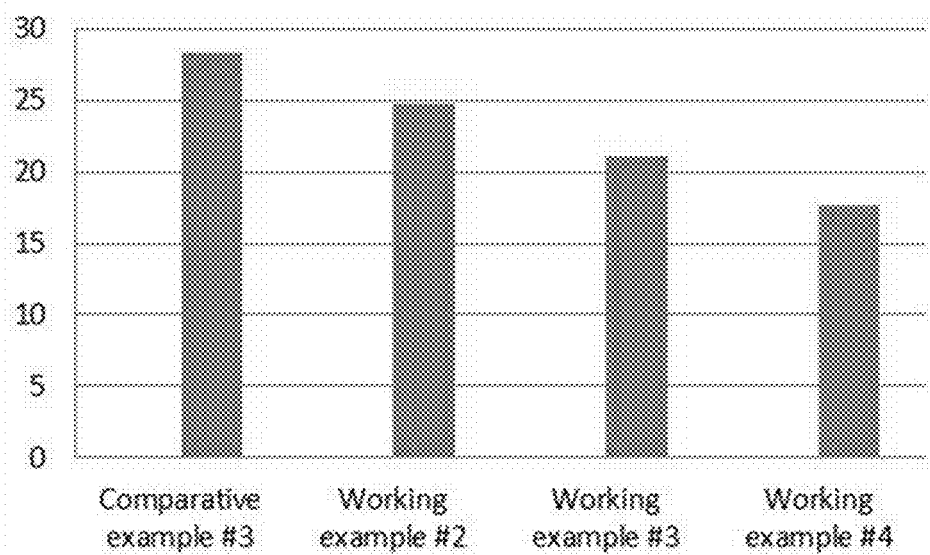
FIG. 3 is a schematic representation of the effect of phosphorous acid (Working Examples 1-4), as an acid melt flow stabilizer additive, on a melt flow rate (MFR) of the thermoplastic polymer blend composition as compared to the comparator example Comparative Example 3.

The results shown in Table 2 are also schematically shown in FIGS. 1-3. FIG. 1 shows how the MFR is affected by the use of citric acid as an acid melt flow stabilizer additive (Working Example 1 compared to Comparative Examples 1-5). FIG. 2 shows how the weight average molecular weight (M$_w$) is affected by the use of citric acid as an acid melt flow stabilizer additive (Working Example 1 compared to Comparative Examples 1-5). FIG. 3 shows how the MFR is affected by the use of phosphorous acid as an acid melt flow stabilizer additive (Working Examples 2-4 compared to Comparative Example 3). It was found that both citric and phosphorous acids are effective in stabilizing the melt flow rate of the thermoplastic composition having a recycle content.

Example Set 2

Additional compositions containing a polycarbonate polymer component and a recycled component were prepared. The formulations of the thermoplastic polymer blends and their performance are shown in Table 3. The polymer compositions of Example Set 2 contain a recycled PCR-ABS-2 component from a different provider than the recycled PCR-ABS-1 component used in Example Set 1 (the source of each component is indicated in Table 1). It was demonstrated that the addition of an acid melt flow stabilizer improves the thermoplastic polymer blend performance regardless of the origin of the recycled component. The addition of an acid melt flow stabilizer also suppresses the polymer degradation of the thermoplastic polymer blend as demonstrated by a decrease in the MFR.

As one of ordinary skills in the art can appreciate, the addition of phosphoric acid (Working Example 5) significantly improves both the notched Izod impact and the MFR of the polymer blend composition as compared to the identical reference compositions in the absence of the acid melt flow stabilizer (Comparative Examples 6).

The MFR and other performance properties of the thermoplastic polymer blend compositions containing a recycled polystyrene component (PCR-PS) were further evaluated by comparing a sample containing citric acid as the acid melt flow stabilizer (Working Example 6) to the identical reference composition without citric acid (Comparative Example 7). A significant increase in the notched Izod impact and a decrease in the MFR were observed, thereby, demonstrating that the addition of the acid melt flow stabilizer suppresses polymer blend composition degradation.

Figure 4:
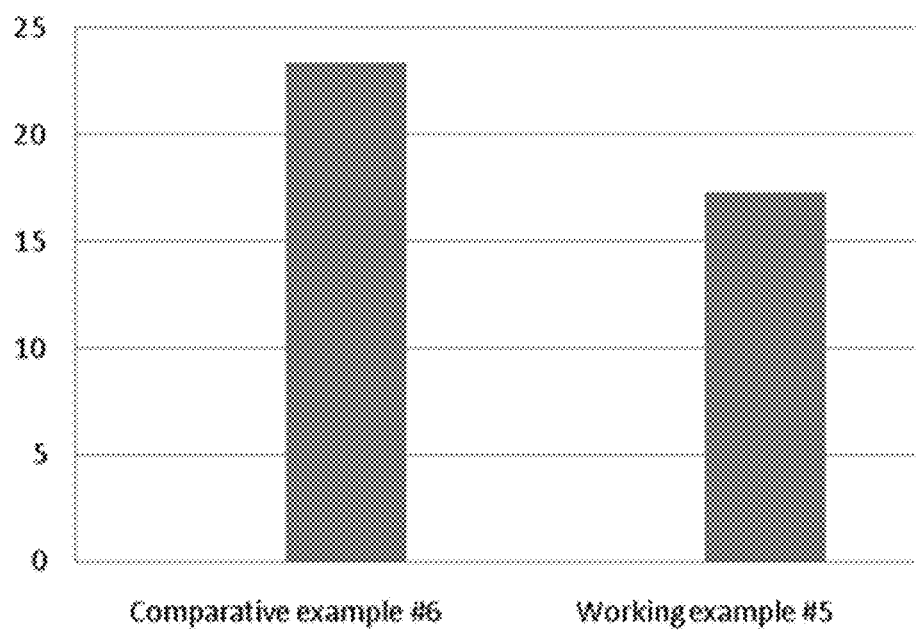
FIG. 4 illustrates that the addition of an acid melt flow stabilizer to the thermoplastic polymer blends containing a post-consumer recycle component suppresses the polymer degradation.
Figure 5:
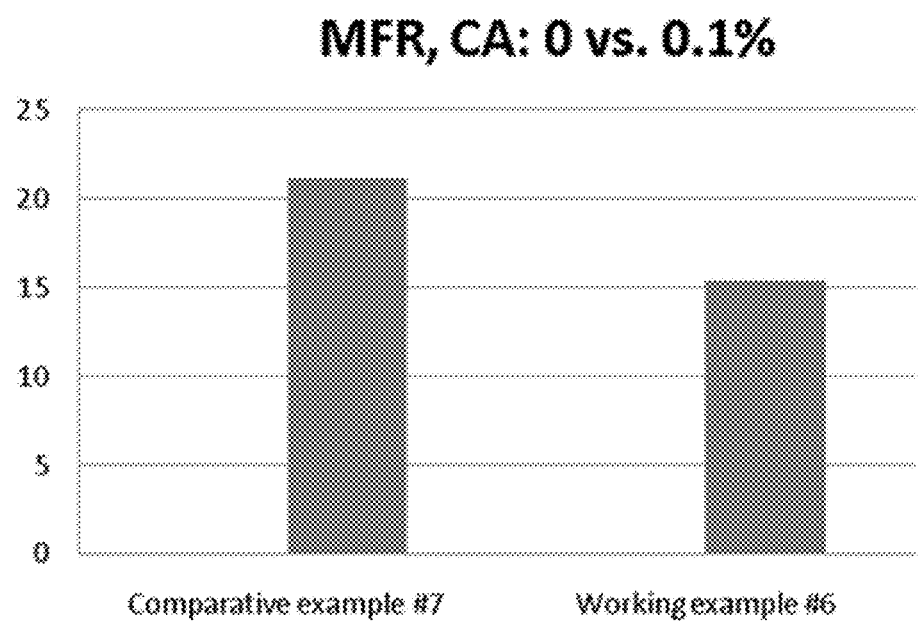
FIG. 5 illustrates that the addition of an acid melt flow stabilizer to the thermoplastic polymer blends containing a post-consumer recycle component suppresses the polymer degradation.

These results are further schematically represented in FIGS. 4 and 5.

TABLE 3

| Component | Units | Comp. Example 6 | Work. Example 5 | Comp. Example 7 | Work. Example 6 |
|---|---|---|---|---|---|
| PC-2 | | 70 | 70 | 80 | 80 |
| PCR-ABS-2 | | 30 | 30 | | |
| PCR-PS | | | | 20 | 20 |
| CA | | | | | 0.1 |
| PA-1 | | | 0.05 | | |
| N. Izod | kg-cm/cm | 34 | 46 | 9 | 11 |
| T/S | kg/cm$^2$ | 593 | 598 | 604 | 610 |
| T/E | % | 15 | 15 | 40 | 107 |
| F/S | kg/cm$^2$ | 937 | 924 | 921 | 892 |
| F/M | kg/cm$^2$ | 24871 | 24675 | 24463 | 24350 |
| HDT, 1.82 MPa | °C. | 111 | 112 | 118 | 118 |
| MFR, 260° C./2.16 kgf | g/10 min | 23 | 17 | 21 | 15 |
| CHCl$_3$ soluble resin M$_n$ | | | | 12080 | 13272 |
| CHCl$_3$ soluble resin M$_w$ | | | | 50693 | 53230 |

Example Set 3

To further evaluate the MFR and other performance properties of the thermoplastic polymer blend compositions additional examples were prepared. The formulations for the prepared thermoplastic polymer blends are shown in Table 4. The performance properties evaluated for the thermoplastic polymer blend compositions are also shown in Table 4. The tested thermoplastic polymer blend composition comprise a mixture of two polycarbonates PC-1 and PC-2 having different molecular weights (the description of the polycarbonates are shown in Table 1), a recycled PCR-ABS-1 component (shown in Table 1), and various concentrations of citric acid (Working Examples 7-13), or phosphorus acid (Working Example 14), or phosphoric acid (Working Example 15). The polymer blend compositions further comprise additional additives that are commonly found in thermoplastic polymer blend compositions. It was shown that both organic (citric) and inorganic (phosphorous and phosphoric acids) acids are effective in the stabilizing thermoplastic polymer blend compositions having a polycarbonate component and a recycle component by suppressing the polymer degradation as compared to the identical reference composition in the absence of the acid melt flow stabilizer (Comparative Example 9 vs. Working Examples 7-13, Comparative Example 9 vs. Working Example 14, Comparative Example 9 vs. Working Example 15).

It was also shown that the addition of citric acid as the acid melt flow stabilizer significantly increases the $M_w$ of polycarbonates as compared to the identical reference composition in the absence of the acid melt flow stabilizer.

Figure 6:
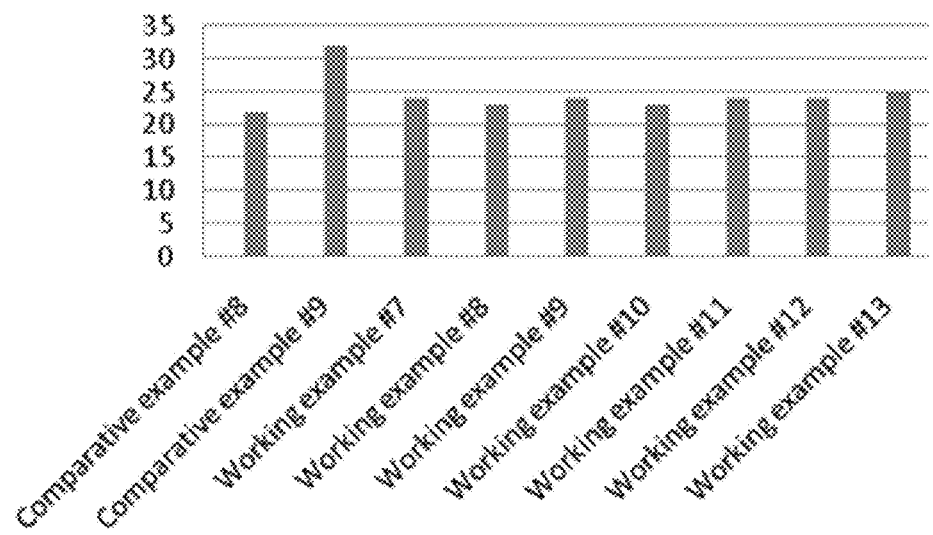
FIG. 6 illustrates that the addition of an acid melt flow stabilizer to the thermoplastic polymer blends containing a post-consumer recycle component suppresses the polymer degradation.
Figure 7:
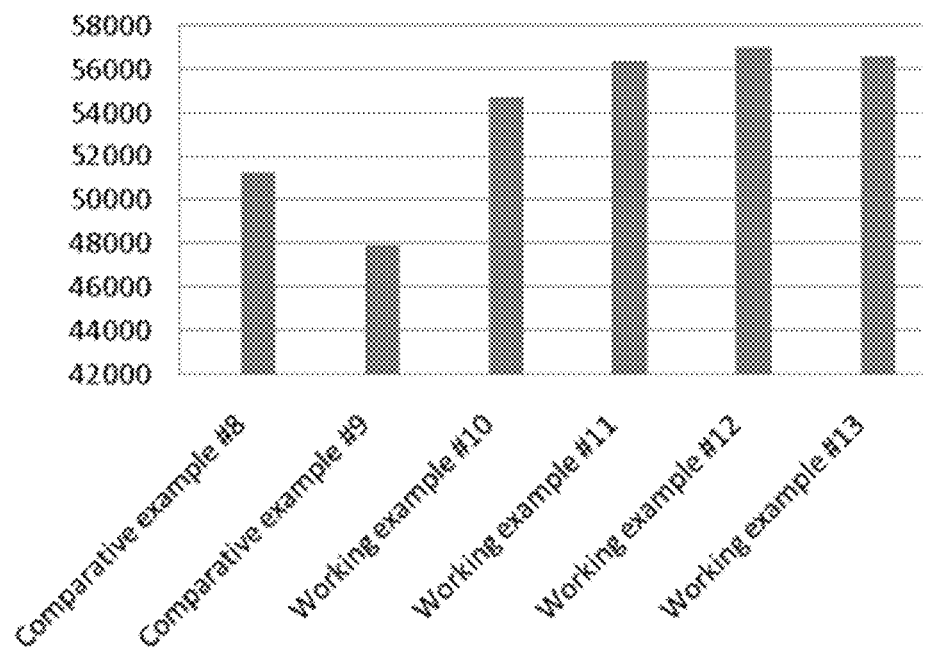
FIG. 7 illustrates that the addition of an acid melt flow stabilizer to the thermoplastic polymer blends containing a post-consumer recycle component suppresses the polymer degradation.

These results are further schematically represented in FIGS. 6 and 7.

TABLE 4

| | units | Com. Ex 8 | Com. Ex 9 | Work Ex 7 | Work Ex 8 | Work Ex 9 | Work Ex 10 | Work Ex 11 | Work Ex 12 | Work Ex 13 | Work Ex 14 | Work Ex 15 |
|---|---|---|---|---|---|---|---|---|---|---|---|---|
| PC-1 | | 35.931 | 35.931 | 35.931 | 35.931 | 35.931 | 35.931 | 35.931 | 35.931 | 35.931 | 35.931 | 35.931 |
| PC-2 | | 32.509 | 32.509 | 32.509 | 32.509 | 32.509 | 32.509 | 32.509 | 32.509 | 32.509 | 32.509 | 32.509 |
| ABS-1 | | 18 | | | | | | | | | | |
| PCR-ABS-1 | | | 18 | 18 | 18 | 18 | 18 | 18 | 18 | 18 | 18 | 18 |
| CA | | | | 0.02 | 0.05 | 0.08 | 0.1 | 0.3 | 0.6 | 0.9 | | |
| PA-1 | | | | | | | | | | | | 0.05 |
| PA-2 | | | | | | | | | | | 0.05 | |
| PFR | | 12.25 | 12.25 | 12.25 | 12.25 | 12.25 | 12.25 | 12.25 | 12.25 | 12.25 | 12.25 | 12.25 |
| STAB-1 | | 0.08 | 0.08 | 0.08 | 0.08 | 0.08 | 0.08 | 0.08 | 0.08 | 0.08 | 0.08 | 0.08 |
| STAB-2 | | 0.08 | 0.08 | 0.08 | 0.08 | 0.08 | 0.08 | 0.08 | 0.08 | 0.08 | 0.08 | 0.08 |
| PETS | | 0.5 | 0.5 | 0.5 | 0.5 | 0.5 | 0.5 | 0.5 | 0.5 | 0.5 | 0.5 | 0.5 |
| PTFE | | 0.65 | 0.65 | 0.65 | 0.65 | 0.65 | 0.65 | 0.65 | 0.65 | 0.65 | 0.65 | 0.65 |
| CB | | 0.6 | 0.6 | | | | 0.6 | 0.6 | 0.6 | 0.6 | | |
| N. Izod | kg-cm/cm | 65 | 5 | 8 | 5 | 6 | 7 | 7 | 6 | 6 | 6 | 6 |
| T/S | kg/cm$^2$ | 637 | 671 | 665 | 661 | 667 | 670 | 674 | 679 | 681 | 667 | 667 |
| T/E | % | 96 | 11 | 14 | 24 | 15 | 14 | 17 | 20 | 16 | 22 | 18 |
| F/S | kg/cm$^2$ | 963 | 1015 | 1028 | 1031 | 1038 | 1015 | 1019 | 1027 | 1023 | 1041 | 1028 |
| F/M | kg/cm$^2$ | 27066 | 28838 | 28600 | 28910 | 28788 | 28483 | 28372 | 28598 | 28507 | 28784 | 28600 |
| HDT, 1.82 MPa | °C. | 92 | 89 | 90 | 89 | 89 | 90 | 88 | 89 | 88 | 90 | 89 |
| MFR, 260° C./2.16 kgf | g/10 min | 22 | 32 | 24 | 23 | 24 | 23 | 24 | 24 | 25 | 23 | 24 |
| CHCl$_3$ soluble resin $M_n$ | | 24835 | 22267 | | | | 25565 | 26334 | 26756 | 27011 | | |
| CHCl$_3$ soluble resin $M_w$ | | 51269 | 47894 | | | | 54716 | 56417 | 57011 | 56603 | | |

Example Set 4

Examples were prepared to further evaluate the MFR and other performance properties of thermoplastic polymer blend compositions containing a mixture of two polycarbonates having different molecular weights (PC-1 and PC-2, as shown in Table 1) and polycarbonate-polysiloxane copolymers (shown as PC-3 in Table 1). The formulations for the prepared thermoplastic polymer blends are shown in Table 5. The performance properties evaluated for the thermoplastic polymer blend compositions are also shown in Table 5. It was demonstrated that thermoplastic polymer blend compositions containing two polycarbonate polymers and a polycarbonate-polysiloxane copolymer, as the polycarbonate component demonstrated have improved melt stability with the addition of the acid melt flow stabilizer (Working Example 16) as compared to the identical polymer blend composition in the absence of the acid melt flow stabilizer (Comparative Example 10). It was also demonstrated that higher loadings of phosphorous acid, as the acid melt flow stabilizer, in the thermoplastic blend compositions with a recycled component results have improved MFRs (Working Examples 17-19).

TABLE 5

|  | units | Comparative Example 10 | Working Example 16 | Comparative Example 11 | Working Example 17 | Working Example 18 | Working Example 19 |
|---|---|---|---|---|---|---|---|
| PC-3 |  | 15 | 15 |  |  |  |  |
| PC-1 |  | 10 | 10 | 35.931 | 35.931 | 35.931 | 35.931 |
| PC-2 |  | 43.44 | 43.44 | 32.509 | 32.509 | 32.509 | 32.509 |
| ABS-1 |  |  |  | 18 |  |  |  |
| PCR-ABS-1 |  | 18 | 18 |  | 18 | 18 | 18 |
| CA |  |  | 0.08 |  |  |  |  |
| PA-1 |  |  |  | 0.05 | 0.01 | 0.03 | 0.05 |
| PFR |  | 12.25 | 12.25 | 12.25 | 12.25 | 12.25 | 12.25 |
| STAB-1 |  | 0.08 | 0.08 | 0.08 | 0.08 | 0.08 | 0.08 |
| STAB-2 |  | 0.08 | 0.08 | 0.08 | 0.08 | 0.08 | 0.08 |
| PETS |  | 0.5 | 0.5 | 0.5 | 0.5 | 0.5 | 0.5 |
| PTFE |  | 0.65 | 0.65 | 0.65 | 0.65 | 0.65 | 0.65 |
| CB |  |  |  |  |  |  |  |
| N. Izod | kg-cm/cm | 24 | 33 | 47 | 5 | 5 | 6 |
| T/S | kg/cm$^2$ | 615 | 615 | 647 | 666 | 668 | 675 |
| T/E | % | 9 | 9 | 102 | 21 | 19 | 15 |
| F/S | kg/cm$^2$ | 942 | 936 | 988 | 1008 | 1008 | 999 |
| F/M | kg/cm$^2$ | 27029 | 26941 | 26885 | 28389 | 28853 | 28357 |
| HDT, 1.82 MPa | ° C. | 87 | 88 | 92 | 89 | 89 | 88 |
| MFR, 260° C./2.16 kgf | g/10 min | 37 | 27 | 24 | 29 | 24 | 22 |

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermoplastic polymer blend composition, comprising:
   a) from about 65 to about 80 parts by weight of at least one bisphenol A polycarbonate polymer component;
   b) from about 15 to about 35 parts by weight of at least one recycled polymer, wherein the at least one recycled polymer comprises one or more of a recycled acrylonitrile-butadiene-styrene (ABS) polymer, a recycled polystyrene (PS) polymer, or a combination thereof, wherein the recycled polymer comprises at least one impurity selected from iron, aluminum, copper, magnesium, calcium and polyurethane particle in an amount in the range from at least about 10 ppm to about 10,000 ppm; and
   c) from greater than 0 to about 0.1 parts by weight of an acid melt flow stabilizer per 100 parts by weight of the thermoplastic blend composition;
   wherein the thermoplastic polymer blend composition exhibits a melt flow rate measured at 260° C./2.16 kgf measured according to ASTM D1238 that is lower than that of an identical reference polymer blend composition in the absence of the acid melt flow stabilizer.

2. The thermoplastic polymer blend composition of claim 1, wherein the polycarbonate polymer component comprises a bisphenol A polycarbonate polymer.

3. The thermoplastic polymer blend composition of claim 2, wherein the polycarbonate polymer component further comprises a polycarbonate-polysiloxane copolymer.

4. The thermoplastic polymer blend composition of claim 1, further comprising from greater than 0 to about 30 parts by weight of a flame retardant.

5. The thermoplastic polymer blend composition of claim 1, wherein the acid melt flow stabilizer comprises an organic acid.

6. The thermoplastic polymer blend composition of claim 5, wherein the organic acid comprises citric acid.

7. The thermoplastic polymer blend composition of claim 1, wherein the acid melt flow stabilizer comprises an inorganic acid.

8. The thermoplastic polymer blend composition of claim 7, wherein the inorganic acid comprises phosphoric acid, phosphorous acid, or a combination thereof.

9. The thermoplastic polymer blend composition of claim 1, wherein the acid melt flow stabilizer is present in an amount from greater than 0 to about 0.05 parts by weight per 100 parts by weight of the thermoplastic polymer blend composition.

10. The thermoplastic polymer blend composition of claim 1, wherein a molded article formed from the thermoplastic polymer blend composition exhibits a notched Izod impact that is greater than that of an identical reference polymer blend composition in the absence of the acid melt flow stabilizer.

11. The thermoplastic polymer blend composition of claim 1, comprising:
   a) from about 65 to about 80 parts by weight of the at least one bisphenol A polycarbonate polymer;
   b) from about 15 to about 35 parts by weight of the at least one recycled polymer;
   c) from greater than 0 to about 0.1 parts by weight of the acid melt flow stabilizer; and
   d) from about 5 to about 20 parts by weight of a flame retardant, wherein total amounts of (a) through (d) are 100 parts by weight.

12. A thermoplastic polymer blend composition, comprising:
- a) from about 65 to about 80 parts by weight of a polycarbonate polymer component;
- b) from about 15 to about 35 parts by weight of at least one recycled polymer comprising one or more of a recycled acrylonitrile-butadiene-styrene (ABS) polymer, a recycled polystyrene (PS) polymer, or a combination thereof, wherein the recycled polymer comprises at least one impurity not present in an identical virgin polymer; and
- c) from greater than 0 to about 0.1 parts by weight of an acid melt flow stabilizer, wherein the acid melt flow stabilizer does not comprise a carboxylic acid;

wherein the thermoplastic polymer blend composition exhibits a melt flow rate measured at 260° C./2.16 kgf measured according to ASTM D1238 that is lower than that of an identical reference polymer blend composition in the absence of the acid melt flow stabilizer.

13. The thermoplastic polymer blend composition of claim 12, wherein the polycarbonate polymer component comprises a bisphenol A polycarbonate polymer.

14. The thermoplastic polymer blend composition of claim 13, wherein the polycarbonate polymer component further comprises a polycarbonate-polysiloxane copolymer.

15. The thermoplastic polymer blend composition of claim 12, wherein a molded article formed from the thermoplastic polymer blend composition exhibits a notched Izod impact that is greater than that of an identical reference polymer blend composition in the absence of the acid melt flow stabilizer.

16. A molded article formed from the composition of claim 1.

* * * * *